United States Patent [19]
Matsuzaki et al.

[11] Patent Number: 5,454,328
[45] Date of Patent: Oct. 3, 1995

[54] CLEANROOM TRANSPORT SYSTEM

[75] Inventors: Hiroshi Matsuzaki; Tetsuo Ajimine; Yukio Iizuka; Kenji Itoh; Katsuhiko Ueda, all of Komaki, Japan

[73] Assignee: Daifuku Co., Ltd., Japan

[21] Appl. No.: 149,213

[22] Filed: Nov. 5, 1993

[30] Foreign Application Priority Data

| Nov. 13, 1992 | [JP] | Japan | 4-303610 |
| Nov. 13, 1992 | [JP] | Japan | 4-303611 |
| Dec. 1, 1992 | [JP] | Japan | 4-321501 |
| Dec. 1, 1992 | [JP] | Japan | 4-321502 |
| Dec. 1, 1992 | [JP] | Japan | 4-321503 |

[51] Int. Cl.$^6$ ............................. B61F 13/00; B60L 13/00
[52] U.S. Cl. ...................... 104/139; 104/290; 105/156
[58] Field of Search ............................. 104/94, 139, 290, 104/292; 105/154, 156; 414/935

[56] References Cited

U.S. PATENT DOCUMENTS

| 4,027,596 | 6/1977 | Nardozzi, Jr. | 104/138.1 |
| 4,649,830 | 3/1987 | Tanaka | 104/138.1 |
| 4,841,869 | 6/1989 | Takevchi et al. | 104/290 X |
| 5,197,391 | 3/1993 | Shimada et al. | 105/149 X |

FOREIGN PATENT DOCUMENTS

| 1035565 | 7/1958 | Germany . | |
| 1175426 | 8/1986 | Japan | 414/935 |
| 55235 | 3/1987 | Japan | 104/139 |
| 63-133643 | 6/1988 | Japan . | |
| 63-304640 | 12/1988 | Japan . | |

*Primary Examiner*—Robert S. Oberleitner
*Assistant Examiner*—Joseph S. Morano
*Attorney, Agent, or Firm*—Webb Ziesenheim Bruening Logsdon Orkin & Hanson

[57] ABSTRACT

A transport system installed in a cleanroom where clean air is caused to flow from a ceiling toward a floor. The transport system includes a vehicle for transporting loads, and a guide rail suspended from the ceiling to guide the vehicle. The vehicle has a main body for running along the guide rail, a load supporting deck disposed over the main body, and connecting members for interconnecting the main body and load supporting deck. The guide rail is enclosed in a tubular cover defining an opening extending longitudinally of the guide rail for receiving the connecting members. The cover has a substantially streamline configuration with respect to the direction of clean air flows.

22 Claims, 22 Drawing Sheets

5,454,328

CLEANROOM TRANSPORT SYSTEM

BACKGROUND OF THE INVENTION

1. Field of the Invention

This invention relates to a cleanroom transport system, and more particularly to a transport system for a cleanroom where clean air is caused to flow from a ceiling toward a floor surface. The transport system includes a guide rail laid in the cleanroom for guiding a load carrying vehicle. The vehicle has a main body for running along the guide rail, a load supporting deck disposed over the main body, and connecting members interconnecting the main body and load supporting deck.

2. Description of the Related Art

As shown in FIG. 29, a conventional cleanroom transport system has a tubular guide rail 31 defining an upper opening, with a main body 32 of a vehicle disposed inside the guide rail 31. This construction is designed to prevent dust produced between the guide rail 31 and running wheels 33 attached to the main body 32 from scattering to the interior of the cleanroom. The dust produced is drawn to air cleaners through a duct 34 or the like.

A load supporting deck 35 is disposed over the main body 32 and connected thereto through connecting members 36. A pair of covers 37 are attached to upper edges of the guide rail 31 to cover an upper opening of the guide rail 31, leaving only a slot for receiving the connecting members 36. The vehicle is propelled by a linear motor including primary coils 38 arranged in lower positions of the guide rail 31, and a secondary conductor plate mounted in a lower position of the vehicle.

In the cleanroom where clean air is caused to flow from the ceiling toward the floor surface, it is desirable to minimize disturbance of air flows caused by objects in the cleanroom. For disturbed air flows would cause dust to float in the cleanroom, and delay discharge of dust through the floor surface.

However, in the prior construction noted above, the guide rail tends to disturb the air flows. The air flows may be less disturbed where the guide rail has a streamline configuration with respect to the air flows. However, for the intrinsic purpose of the guide rail, strength and dimensional precision are an important consideration to which priority must be given. For reasons of manufacture and installation also, it has been difficult to provide the guide rail with such a streamline configuration.

SUMMARY OF THE INVENTION

The present invention has been made having regard to the state of the art noted above, and its object is to provide a transport system which, regardless of the guide rail configuration, hardly disturbs clean air flowing from the ceiling toward the floor surface of a cleanroom.

The above object is fulfilled, according to the present invention, by a cleanroom transport system comprising a guide rail installed for guiding a load carrying vehicle in a cleanroom where clean air is caused to flow from a ceiling toward a floor surface. The vehicle includes a main body for running along the guide rail, a load supporting deck disposed over the main body, and connecting members for interconnecting the main body and the load supporting deck. The guide rail is enclosed in a tubular cover having an opening extending longitudinally of the guide rail for receiving the connecting members. The cover has a substantially streamline configuration with respect to a direction of clean air flows, as seen in a longitudinal direction thereof.

With the above construction, the clean air flowing from the ceiling to the floor of the cleanroom does not contact the guide rail directly but flows smoothly downward along the streamlined tubular cover enclosing the entire guide rail. Thus, regardless of the shape of the guide rail, the clean air is little disturbed in flowing from the ceiling to the floor.

The main body of the vehicle is enclosed in the tubular cover along with the guide rail. Consequently, dust produced by friction between the running wheels and guide rail, for example, is not scattered to the interior of the cleanroom. On the other hand, the load supporting deck is disposed above and outside the tubular cover to facilitate loading and unloading at stations.

The guide rail may include air cleaners for drawing and cleaning air from adjacent the main body. The air cleaners may be mounted in a space defined by a bottom surface of the guide rail and a lower wall of the cover.

With this construction also, the clean air flowing from the ceiling to the floor of the cleanroom does not contact the guide rail or air cleaners directly, but flows smoothly downward along the streamlined tubular cover containing the entire guide tail. Where the air cleaners have an elongated shape extending along the bottom surface of the guide rail, the space defined by the bottom surface of the guide rail and the lower wall of the cover need not have a large sectional area.

Thus, the guide rail, the air cleaners extending along the bottom surface thereof, and the tubular cover enclosing the guide rail and air cleaners, may be formed as a unit. This allows the transport system to be installed with ease. The clean air is little disturbed in flowing from the ceiling to the floor.

Each of the Connecting members may have a substantially lozenge-shaped cross section tapered longitudinally of the vehicle, at least in a region thereof extending through the opening.

In this way, a large sectional area of each connecting member is secured, and yet the connecting members are not rubbed against end faces of the cover defining the opening when the vehicle runs along curved portions of the guide rail.

Thus, while securing a necessary strength of the connecting members between the mainbody and load supporting deck of the vehicle, the opening in the upper wall of the cover may be formed narrow to receive the connecting members.

The guide rail may have a U-shaped section to guide the vehicle for carrying loads and having right and left running wheels rotatable about horizontal axes, and right and left rollers rotatable about vertical axes. The guide rail may include a pair of fight and left horizontal guides, each projecting inwardly from a vertically intermediate position of an inner wall of the guide rail, the running wheels contacting upper surfaces of the horizontal guides, and the rollers contacting fight and left inner walls above the horizontal guides. The guide rail may further include struts extending between the right and left horizontal guides and arranged at suitable intervals longitudinally of the guide rail to prevent the inner walls of the guide rail from bending inwardly.

With this construction, the struts extending between the right and left horizontal guides and arranged at suitable intervals prevent the inner walls of the guide rail from bending inwardly. Thus, it is unnecessary to rely solely on the wall thickness of the guide rail for resisting stress of the right and left walls due to the weight of the vehicle and loads thereon and tending to bend the walls inwardly.

Where primary coils of a linear motor are mounted in a bottom space of the guide rail including the right and left horizontal guides, such struts may be arranged at suitable intervals along the guide rail, utilizing the bottom space, provided that the primary coils are distributed longitudinally of the guide rail.

Thus, bending of the side walls of the guide rail is prevented reliably while allowing the guide rail to have a reduced wall thickness to achieve lightweight and low cost. The struts bridging the right and left horizontal guides may have a minimal length to resist most effectively the stress due to the weight of the vehicle and loads carried by the vehicle.

Each of the horizontal guides may include a groove formed in a substantially middle position in a direction of thickness thereof, the groove defining upper and lower surfaces corrugated as seen in a longitudinal direction of the guide rail, the struts being fixed to the horizontal guides by screwing bolts into the grooves.

According to this construction, where the guide rail is formed by extrusion molding, the guide rail requires no special shaping process for fixing the struts between the horizontal guides. Moreover, the struts may be fixed in any selected positions longitudinally of the guide rail. The grooves defining the upper and lower surfaces of corrugated section may be formed by extrusion molding. These corrugated upper and lower surfaces act as female screws for meshing with the bolts used to fix the struts to the horizontal guides.

The main body of the vehicle may include a brake device biased to a braking position and a retainer for retaining the brake device in a brake releasing position, the guide rail and the cover constituting a guide structure including a brake control device for canceling retaining action of the retainer to move the brake device to the braking position. The guide structure may include a brake releasing device for returning the retainer to an operative state, the brake releasing device including a base movable on upper surfaces of the guide structure and along the opening, and an engaging member attached to the base for extending through the opening into an interior of the guide structure, the engaging member pushing a particular portion of the retainer to return the retainer to the operative state as the base is moved along the upper surfaces of the guide structure toward the vehicle braked by the brake device.

With this construction, in order to reinstate a brake releasing condition of the vehicle braked by the brake device, i.e. at an emergency standstill, the brake releasing device may only be moved from a predetermined direction along the upper surfaces of the guide structure toward the vehicle, with the engaging member inserted through the opening into the interior of the guide structure. Then the engaging member pushes the particular portion of the retainer to return the retainer to the operative state. Consequently, the brake device is returned to and maintained in the brake releasing position.

The brake releasing operation is required only when the vehicle has made an emergency stop owing to power failure or the like, which takes place rarely. However, the simpler this operation is, the shorter time is consumed before the system operation is resumed. It is therefore desirable to effect the brake releasing operation without removing the vehicle from the guide structure. When the brake control device is installed in new locations with variations in transport paths or addition of stations, the above construction is advantageous in that upper cover portions need not be changed.

Thus, the above construction advantageously facilitates the brake releasing operation without removing the vehicle from the guide structure.

The base may include a grip handle to enable a manual operation.

Then, the operator may hold the grip handle to move the brake releasing device along the upper surfaces of the guide structure toward the vehicle with ease.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

A cleanroom transport system according to the present invention will be described in detail hereinafter with reference to the drawings.

Figure 1:
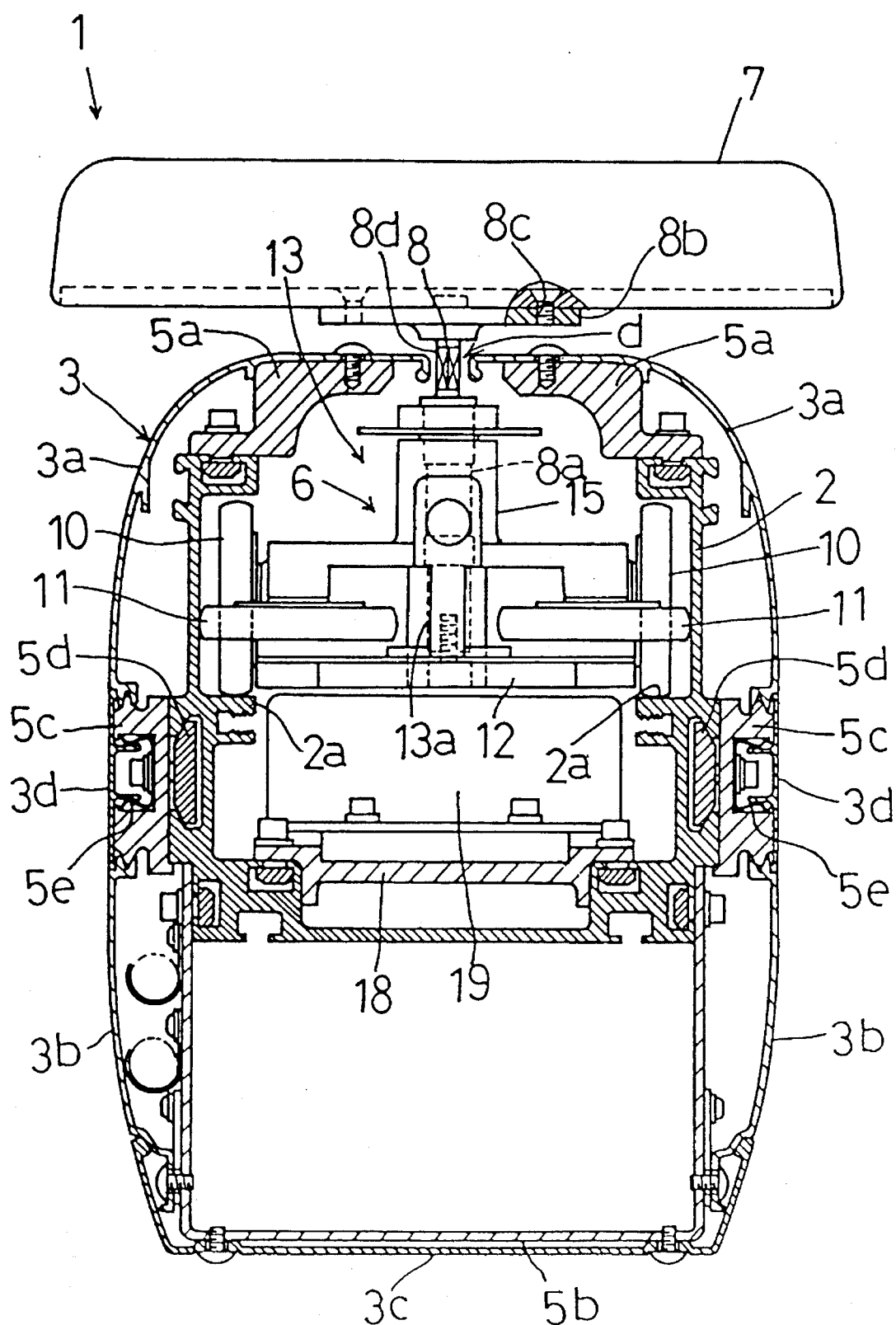
FIG. 1 is a sectional view of a vehicle and a guide rail of a transport system according to the present invention.

As shown in FIG. 1, a vehicle 1 for transporting loads is guided by a guide rail 2 in a cleanroom in which clean air is caused to flow from a ceiling toward a floor. The guide rail 2 and a tubular cover 3 enclosing the entire guide rail 2 are suspended from the ceiling through support members 4. The vehicle 1 is propelled by a ground primary type linear motor to run along the guide rail 2, carrying loads (semiconductor wafers) from one station to another.

FIG. 1 shows a section of the guide rail 2 and cover 3 as seen in a longitudinal direction thereof. The guide rail 2 has a U-shaped section and is formed by extrusion molding an aluminum material. The cover 3 includes a plurality of cover members 3a–3d as described below. The cover 3 has a streamline shaped section as seen in the longitudinal direction, with respect to the direction of clean air flows (from ceiling to floor). This shape is employed in order to minimize disturbance of the clean air flows. The cover 3 contains, besides the guide rail 2, primary coils of the linear motor, control units, clean units and the like.

The cover 3 includes a pair of fight and left upper cover members 3a, a pair of right and left side cover members 3b, a bottom cover member 3c, and a pair of right and left support groove cover members 3d. The support groove cover members 3d are formed of plastic, while the other cover members 3a, 3b and 3c are formed of an aluminum alloy, all manufactured by extrusion molding.

Figure 2:
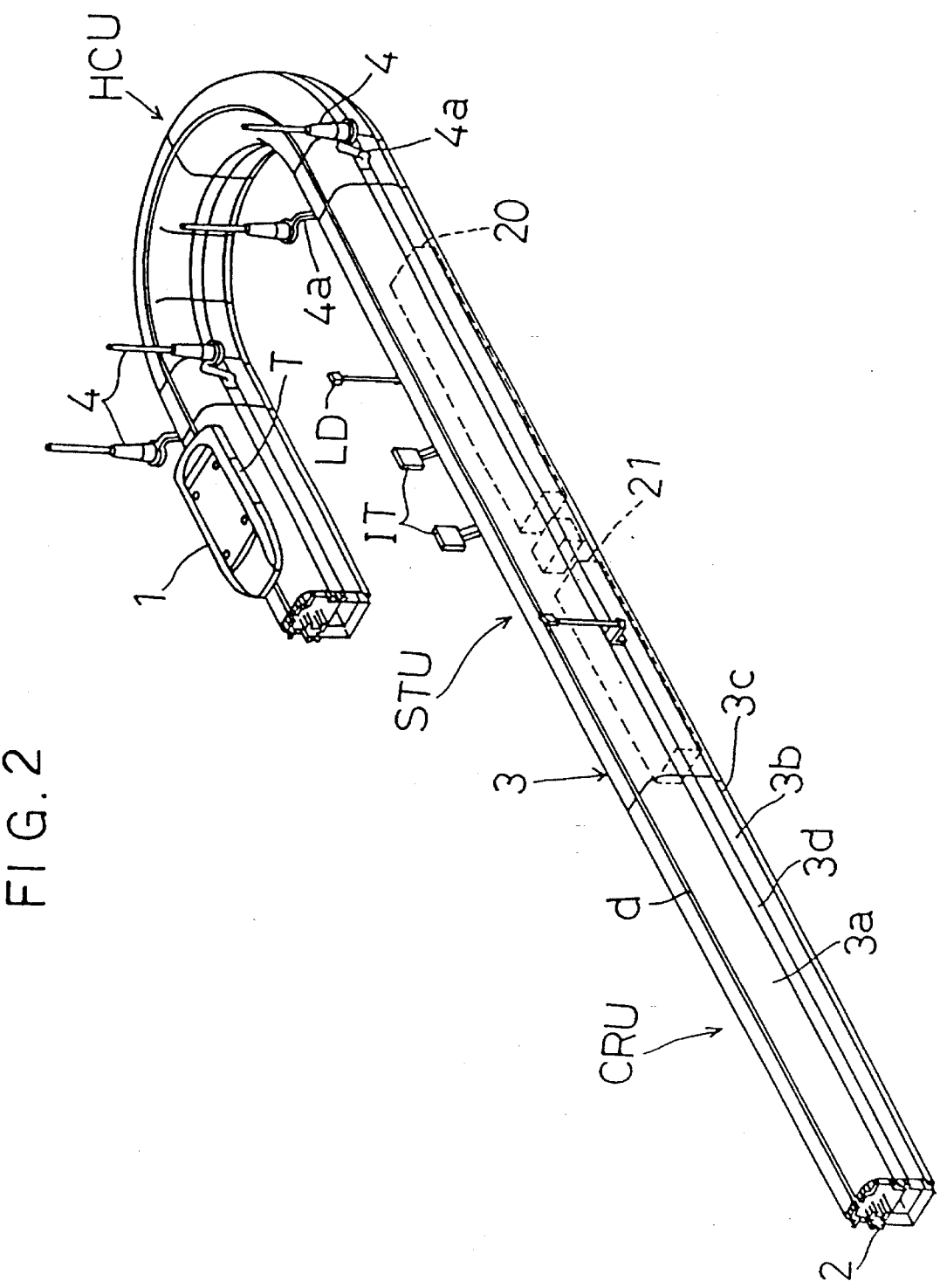
FIG. 2 is a perspective view of a portion of the transport system.

Different guide rail units 2 and cover members 3a–3d are prepared for use in straight portions and curved portions (right curves and left curves) having predetermined lengths. These components are connected to form a predetermined running track of the vehicle, e.g. a looped track. In practice, plural types of guide rail units with control units and the like assembled thereto are prepared, such as station rail units STU, intermediate rail units CRU and curved rail units HCU as shown in FIG. 2. These units are connected when installing the transport system.

Elements for connecting the guide rail 2 are used also for supporting the cover members 3a–3d. As shown in FIG. 1, a pair of fight and left upper brackets 5a, a lower bracket 5b having a U-shaped section and a pair of fight and left cover blocks 5c are disposed in connecting positions of the guide rail 2. Each of the cover blocks 5c, in combination with a tap plate 5d, clamps predetermined lateral portions of the guide rail 2 to connect the guide rail 2. Similarly, the upper and lower brackets 5a and 5b clamp predetermined portions of the guide rail 2. Each of the upper cover members 3a includes a groove formed in a lower end thereof, which is engaged by a projection formed on an upper surface of the cover block 5c. Each upper cover member 3a is secured at an upper end thereof to an upper surface of the upper bracket 5a by screws.

Each of the side cover members 3b includes a groove formed in an upper end thereof, which is engaged by a projection formed on a lower surface of the cover block 5c. Each side cover member 3b is secured at a lower end thereof to a side surface of the lower bracket 5b by screws. The bottom cover member 3c has lateral ends thereof overlapping the lower ends of the side cover members 3b, and is secured to lower surfaces of the lower bracket 5b by screws. Each of the support groove cover members 3d includes engaging projections formed on one side thereof, which are press fit in a plate spring 5e mounted in a side recess of the cover block 5c.

As shown in FIG. 2, the support members 4 for suspending the guide rail 2 are connected to the guide rail 2 through support brackets 4a. These support brackets 4a, support brackets of communication units IT for communicating with the vehicle 1, and support brackets of load detecting sensors LD for checking presence or absence of loads on the vehicle 1, are secured to the side surfaces of the guide rail 2 in the same way as the cover blocks 5c are secured thereto. The elements for connecting the guide rail 2 further include plates (not shown) secured to bottom surfaces of the guide rail 2 by screws.

As shown in FIG. 1, the vehicle 1 includes a main body 6 disposed inside the guide rail 2 having a U-shaped section, a load supporting deck 7 disposed over the main body 6, and connecting members 8 interconnecting the main body 6 and load supporting deck 7. The cover 3 has an opening "d" defined in an upper wall thereof and extending longitudinally of the guide rail 2 for receiving the connecting members 8. That is, the opening "d" is formed between inward end surfaces of the fight and left upper cover members 3a.

Figure 4:
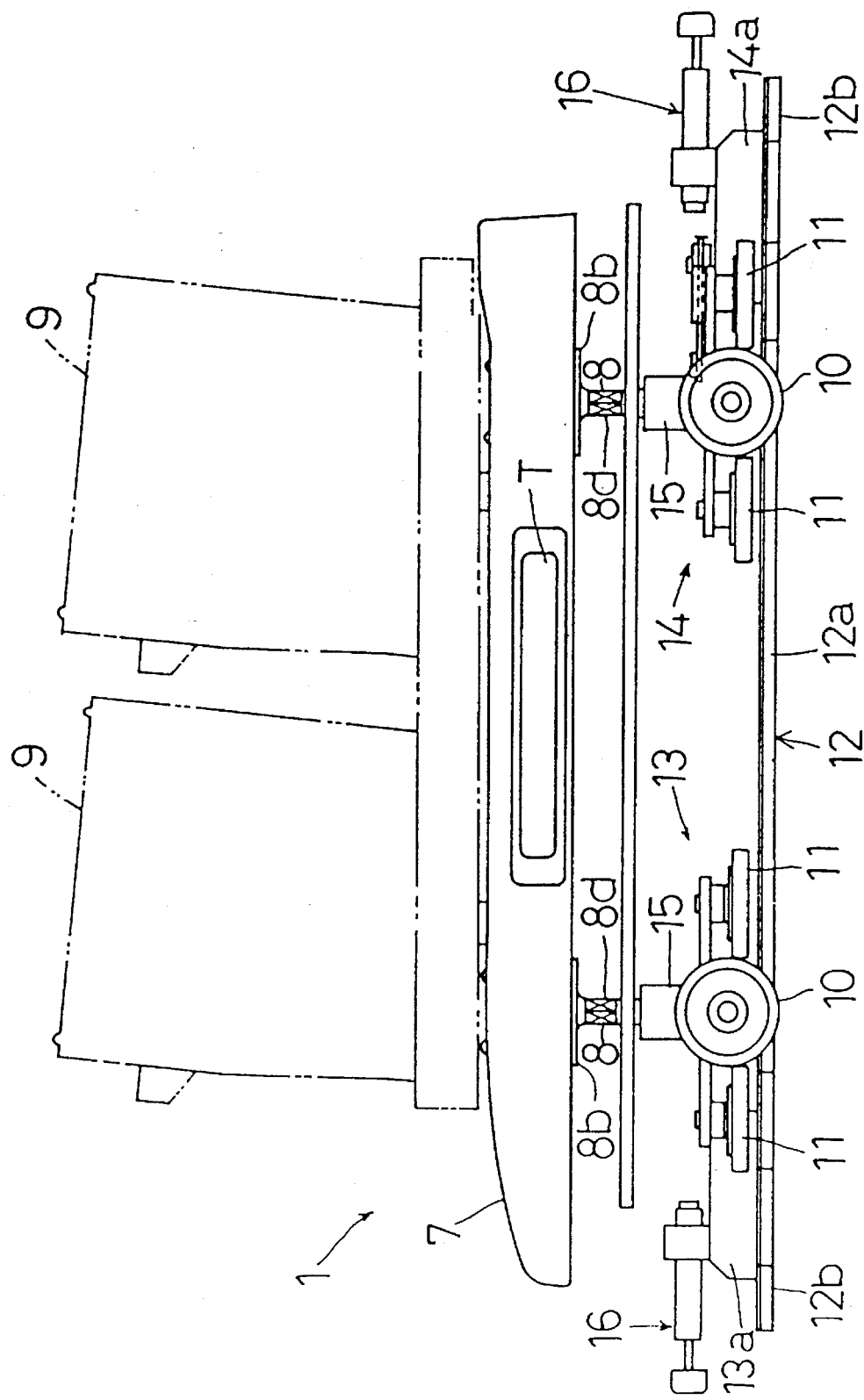
FIG. 4 is a side view of the vehicle.

The load supporting deck 7 of the vehicle 1 may support two semiconductor wafer carries 9 arranged longitudinally of the vehicle 1 (see FIG. 4). The main body 6 includes running wheels 10 rotatable about horizontal axes, and lateral position setting rollers 11 rotatable about vertical axes. The running wheels 10 are in contact with a pair of fight and left horizontal guides 2a each projecting inwardly from a vertically intermediate position of an inner wall of the guide rail 2. The rollers 11 are in contact with fight and left inner walls above the horizontal guides 2a. The main body 6 further includes a secondary conductor 12 in the form of horizontal plates mounted in a bottom center position thereof to constitute part of the linear motor.

The construction of the main body 6 of the vehicle 1 will be described in detail hereinafter.

Figure 3:
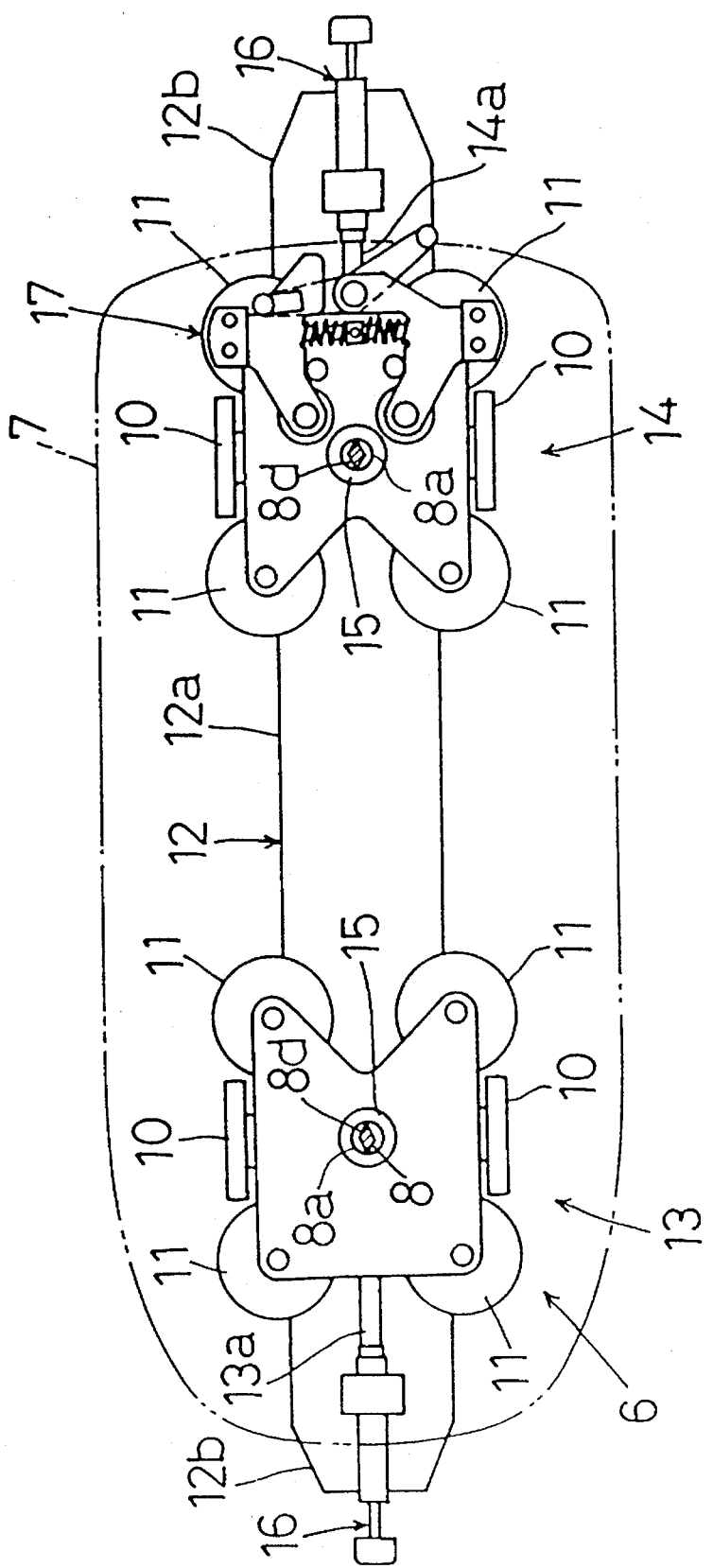
FIG. 3 is a plan view of the vehicle.

As shown in FIGS. 3 and 4, the main body 6 includes a front and rear wheel units 13 and 14 each having a pair of fight and left running wheels 10 and two pairs of right and left rollers 11. Each of the wheel units 13 and 14 is swivelable about a vertical axis relative to the load supporting deck 7. Specifically, each wheel unit 13 or 14 has a sleeve shaft 15 fixed centrally thereof and rotatably fitted on the front or rear connecting member 8 in the form of a bar fixed to and depending from a bottom surface of the load supporting deck 7. The connecting member 8 extends through the sleeve shaft 15, and the secondary conductor 12 is fixed to a lower end of the connecting member 8.

Figure 5:
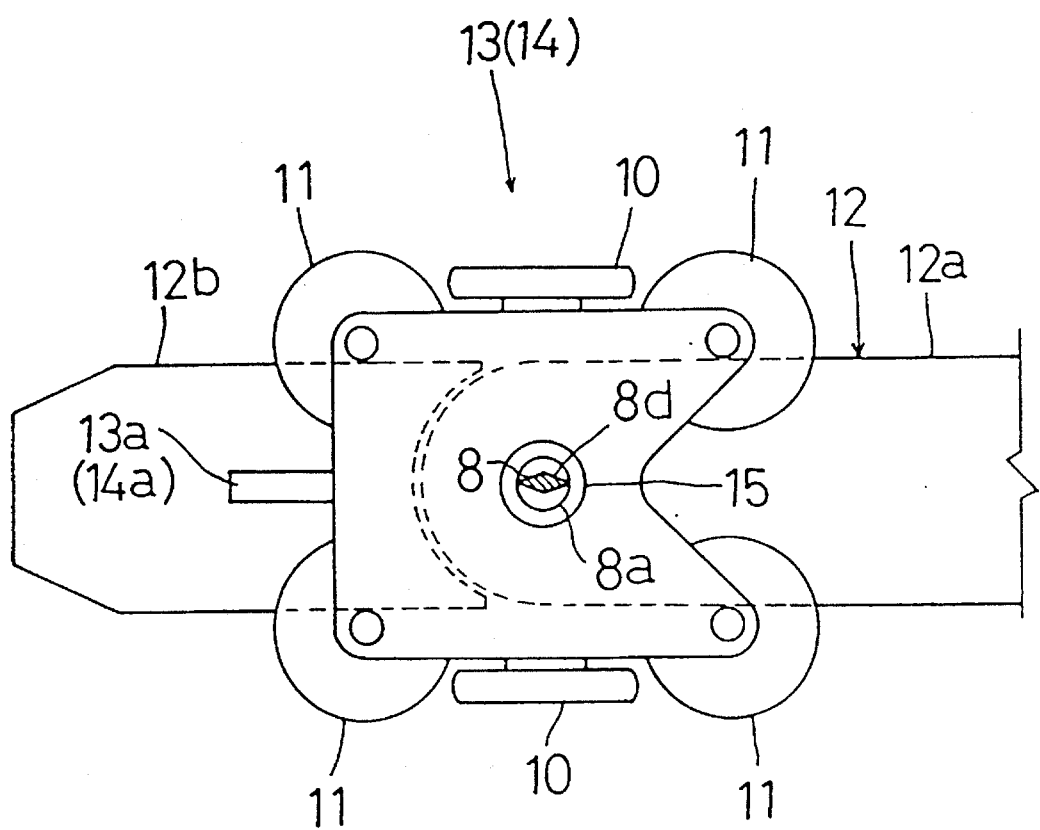
FIG. 5 is a fragmentary plan view showing a wheel unit of the vehicle.

The secondary conductor 12 is divided into three pans arranged longitudinally of the vehicle 1. The middle conductor pan 12a is fixed at front and rear positions thereof to the lower ends of the connecting members 8 as described above. As shown in FIG. 5, the front and rear conductor pans 12b are fixed to vertical members 13a and 14a depending from bottom surfaces of frames of the wheel units 13 and 14, respectively.

With the main body 6 having the above construction, the vehicle 1 is capable of running smoothly through curved portions of the guide rail 2. In this state, the front and rear wheel units 13 and 14 are turned in different directions along the curved portions, with the two pairs of fight and left rollers 11 of each wheel unit 13 or 14 contacting the fight and left inner walls of the guide rail 2. Consequently, the front and rear conductor parts 12b are in different angular relations to the middle conductor pan 12a. The secondary conductor 12 as a whole is flexed to follow the curve in plan view.

Each conductor pan is formed of an aluminum plate having a steel sheet applied to an upper surface thereof, the steel sheet forming a magnetic circuit. Each of the front and rear wheel units 13 and 14 includes a shock absorber 16. The rear wheel unit 14 further includes an emergency brake unit 17 and the like.

Referring to FIG. 1, the guide rail 2 includes a wide recess formed in a bottom region thereof to define a duct with a base plate 18 fitted in an upper position of the recess and extending longitudinally of the guide rail 2. As described hereinafter, the duct acts as an air suction duct to feed air to the clean units. Primary coils 19 of the linear motor and other elements are mounted on the base plate 18. When excited by an AC having a predetermined frequency, the primary coils 19 generate propelling magnetic fields to apply a propelling force to the secondary conductor 12, and thus to the vehicle 1, lying over the primary coils 19.

To achieve reduced installation cost, the primary coils 19 are arranged at fixed intervals along the guide rail 2. The vehicle 1 runs from one primary coil 19 to another by inertia. However, primary coils 19 must be provided in a stopping position of the vehicle 1 and before and after the stopping position at each station, for accelerating the vehicle 1 after a start or decelerating the vehicle 1 to a stop. Primary coils 19 for intermediate acceleration are arranged at the fixed intervals between stations. Thus, each station rail unit STU includes three primary coils 19, while each intermediate rail unit CRU includes one primary coil 19.

Control units 20 in the form of a plurality of control substrates and clean units 21 are mounted in a space defined by the bottom surface of the guide rail 2 and the bottom wall of the cover 3 (see FIG. 2). The control units 20 control excitation voltage or the like of the primary coils 19 to accelerate and decelerate the vehicle 1.

Each station rail unit STU includes an electromagnetic unit and a positioning unit Controlled by the control unit 20 to stop the vehicle 1 at a predetermined position. The vehicle 1 includes an ID card T which is a storage medium having a radio communication device and attached to a side surface of the load supporting deck 7. The guide rail 2 includes communication devices IT supported on lateral surfaces thereof. The control unit 20 also controls communications regarding destination information, weight information and the like exchanged between the ID card T and communication devices IT, and Controls checking by the load sensor LD of presence or absence of loads carried.

Figure 7:
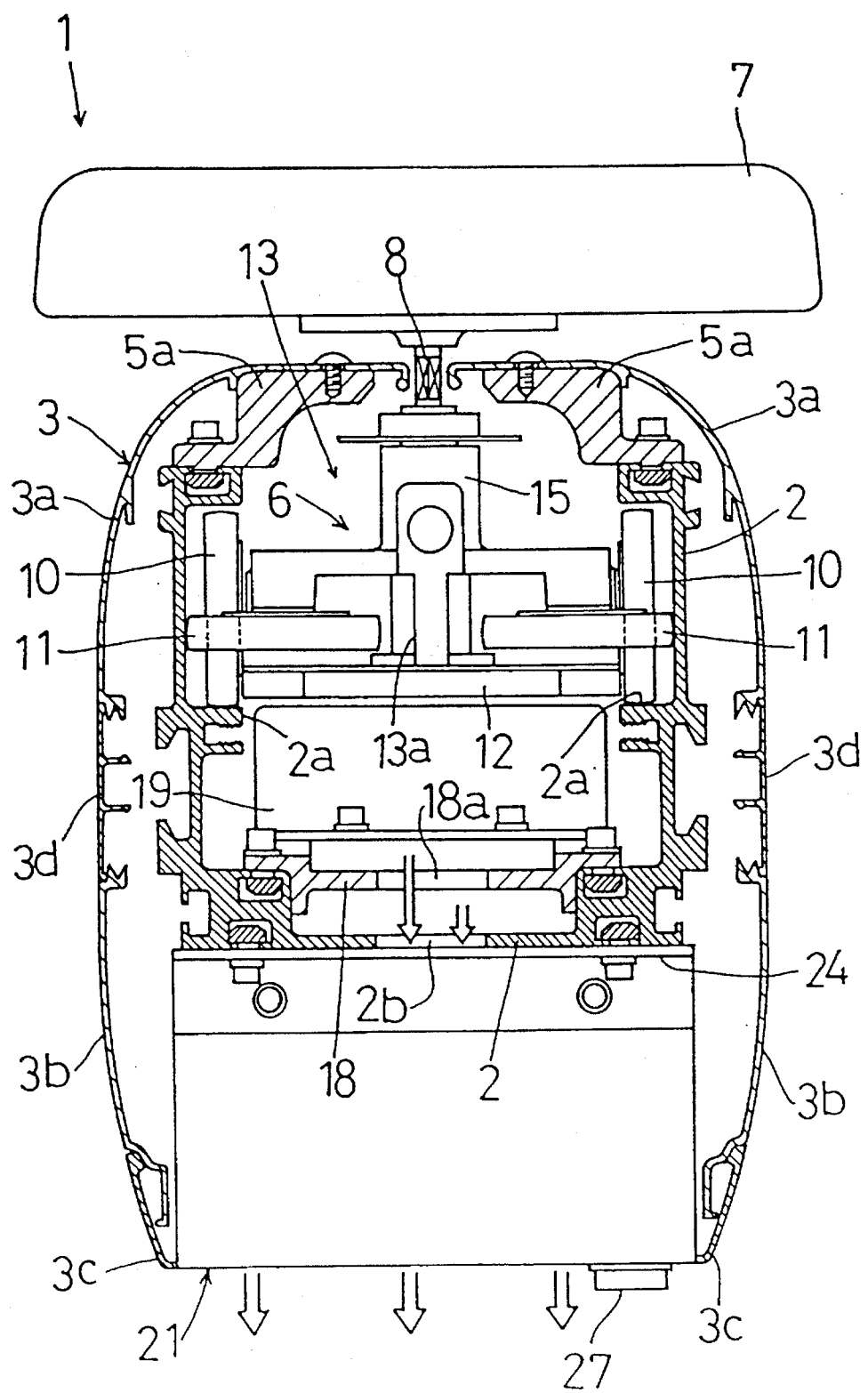
FIG. 7 is a sectional view of a portion including an air cleaner.

As shown in FIG. 7, each clean unit 21 is an air cleaning device for drawing dust produced through friction between the guide rail 2 and the running wheels 10 and rollers 11 of the vehicle 1, along with air around the main body 6 of, the vehicle 1, to prevent the dust from scattering to the interior of the cleanroom. As noted hereinbefore, the duct defined by the wide recess in the bottom region of the guide rail 2 and the base plate 18 acts as an air suction duct. The base plate 18 defines openings 18a in selected positions thereof for communicating the duct with upper spaces. The bottom wall of the guide rail 2 defines openings 2b for communicating with the clean units 21.

Thus, clean air in the cleanroom is drawn in through the opening "d" between the pair of fight and left upper cover members 3a, to flow with dust produced around the main body 6 of the vehicle 1 through the communicating openings 18a formed in the base plate 18, along the duct, and through the communicating openings 2b formed in the bottom wall of the guide rail 2, to the clean units 21.

Figure 6:
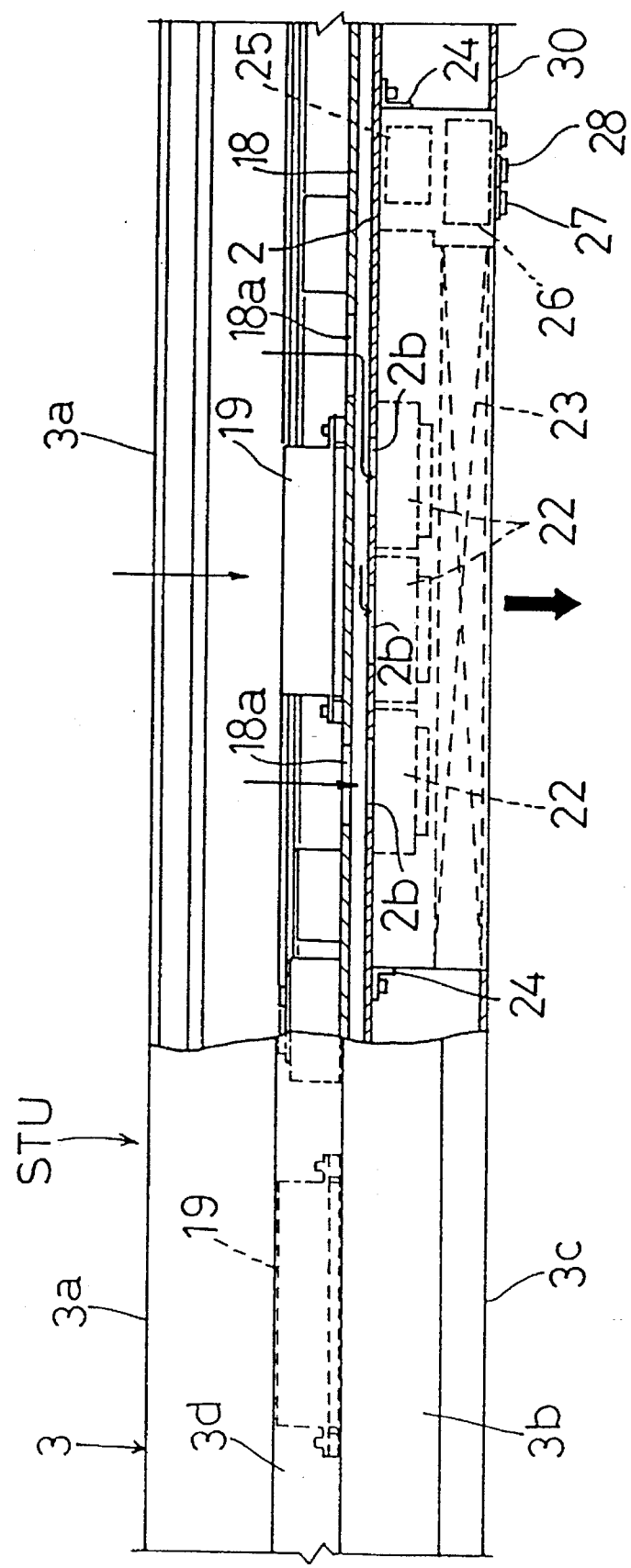
FIG. 6 is a side view of the guide rail.

As shown in FIG. 6, each clean unit 21 includes suction fans 22 and an air filter 23. Air drawn in through upper openings is cleaned by passing through the air filter 23, and discharged downward through lower surfaces. Thus, the bottom cover member 3c of the guide rail 2 defines openings. Each clean unit 21 is secured at front and rear ends thereof to the bottom surface of the guide rail 2 by crews through L-shaped metal fittings 24. Each clean unit 21 further includes a power source 25 and a control box 26 mounted in a small compartment laterally of the fans 22 and air filter 23.

Figure 8:
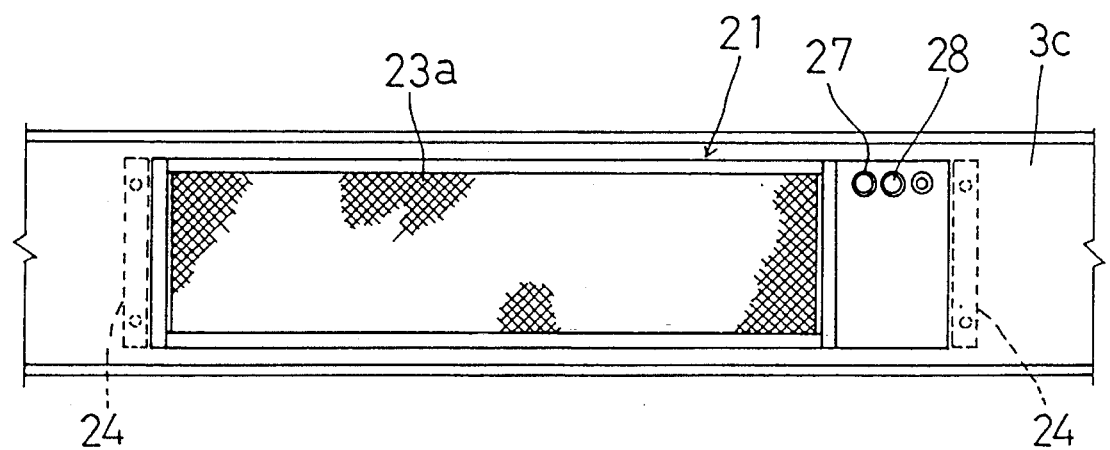
FIG. 8 is a bottom view of the air cleaner.

As shown in FIG. 8, the air filter 23 has a net 23a defining a bottom of the clean unit 21, With a power lamp 27, an emergency lamp 28 and the like arranged adjacent one end thereof. These lamps 27 and 28 are visible through an opening formed in the bottom cover member 3c of the guide rail 2.

The clean units 21 are provided in three, large, medium and small, sizes. Each station rail unit STU has a large clean unit 21. Each intermediate rail unit SRU has a medium size clean unit 21. Each curved rail unit HCU has a small clean unit 21. FIG. 6 shows a large clean unit 21 which has three suction fans 22.

The above embodiment may be modified as follows:

(1) The guide rail cover may be formed of other materials and by other methods than extrusion molding of an aluminum material in the above embodiment. For example, all the cover members may be formed by injection or vacuum molding plastic. The cover will serve the purpose of the present invention as long as the cover has a streamline configuration with respect to the direction of air flows as seen in the longitudinal direction thereof. The cover may be divided into a plurality of cover members or may be supported by the guide rail in various other ways also.

(2) The guide rail is not limited to the U-shaped section. The present invention is applicable also to a monorail type system, for example, including a guide rail having a rectangular section, and a vehicle with running wheels rotatable on an upper surface of the guide rail, and rollers rotatable on opposite side surfaces thereof. Further, the invention is applicable to a magnetic levitation type transport system in which a vehicle is magnetically levitated from a guide rail.

(3) The air cleaning device may be attached to the bottom wall of the guide rail in various other ways than what is described in the foregoing embodiment. For example, the suction fans 22 and air filter 23 may be arranged longitudinally rather than vertically.

Another embodiment will be described next.

Figure 9:
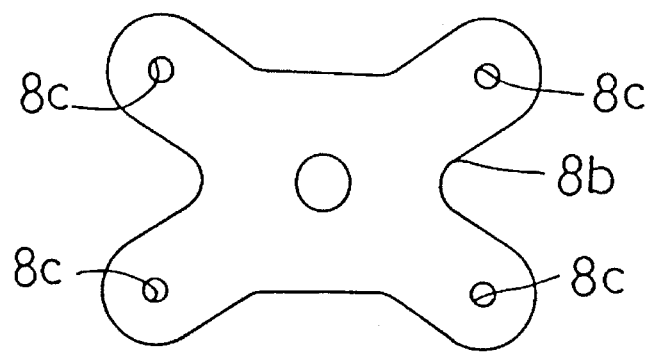
FIG. 9 is a plan view of a connecting member for interconnecting a main body and a load supporting deck of the vehicle.
Figure 10:
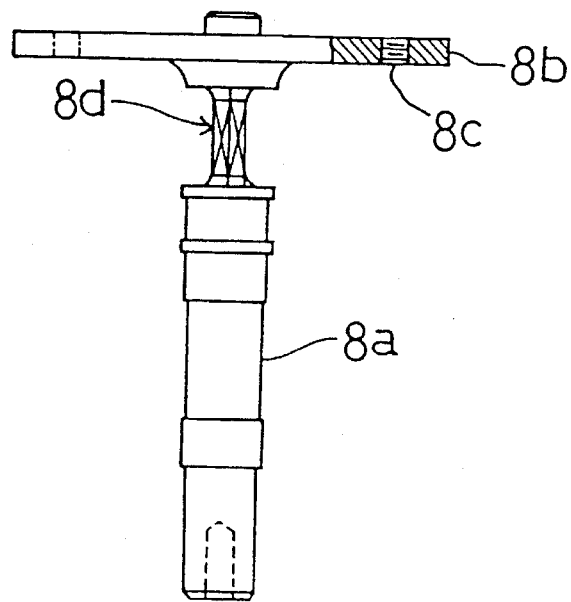
FIG. 10 is a side view of the connecting member.
Figure 11:
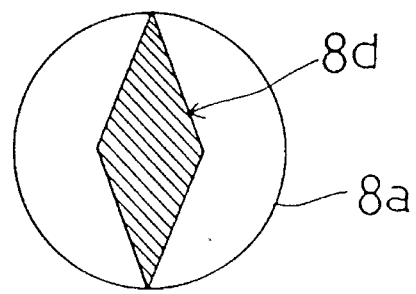
FIG. 11 is a sectional view of a portion of the connecting member.
Figure 12:
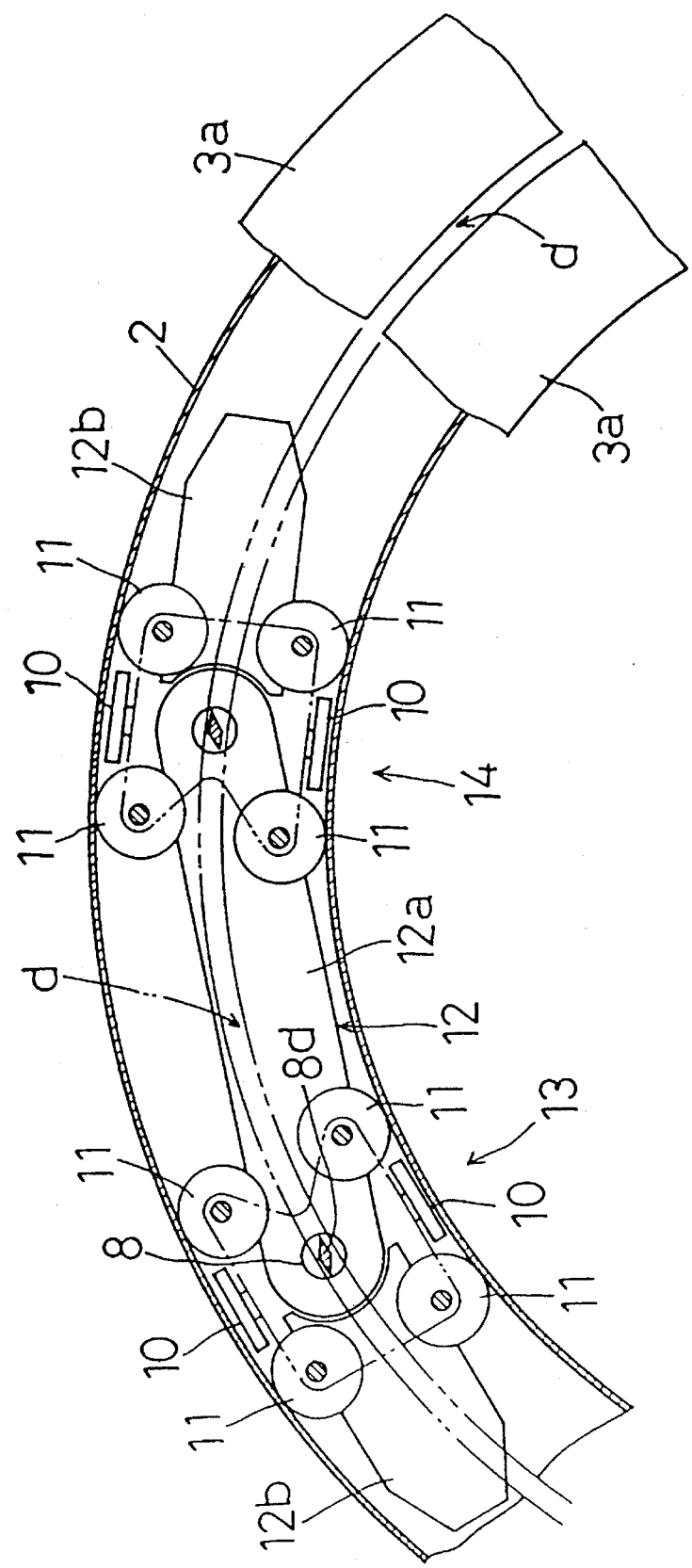
FIG. 12 is a sectional plan view showing the vehicle in a curved portion of the guide rail.

As shown in FIGS. 9 through 11, each of the connecting members 8 in this embodiment has a shank portion 8a and a plate portion 8b formed integrally by casting. This connecting member 8 is attached to the bottom surface of the load supporting deck 7, using four tapped bores 8c formed in the plate portion 8b. The shank portion 8a includes a region 8d lying in the opening "d", which is cut to a cross section as shown FIG. 11. That is, a round bar is cut mainly at right and left sides to have a lozenge-shaped section tapered longitudinally of the vehicle 1. This shape, while retaining a necessary strength of the connecting member 8, allows the vehicle to run smoothly through curved portions of the guide rail 2. Specifically, as shown in FIG. 12, the region 8d of the connecting member 8 lying in a curved portion of the opening "d" remains out of contact with end faces of the upper cover members 3a.

In this state the front and rear wheel units 13 and 14 are turned in different directions along the curved portion, with the two pairs of fight and left rollers 11 of each wheel unit 13 or 14 contacting the fight and left inner walls of the guide rail 2. Consequently, the front and rear conductor pans 12b are in different angular relations to the middle conductor part 12a. The secondary conductor 12 as a whole is flexed to follow the curve in plan view.

Figure 13:
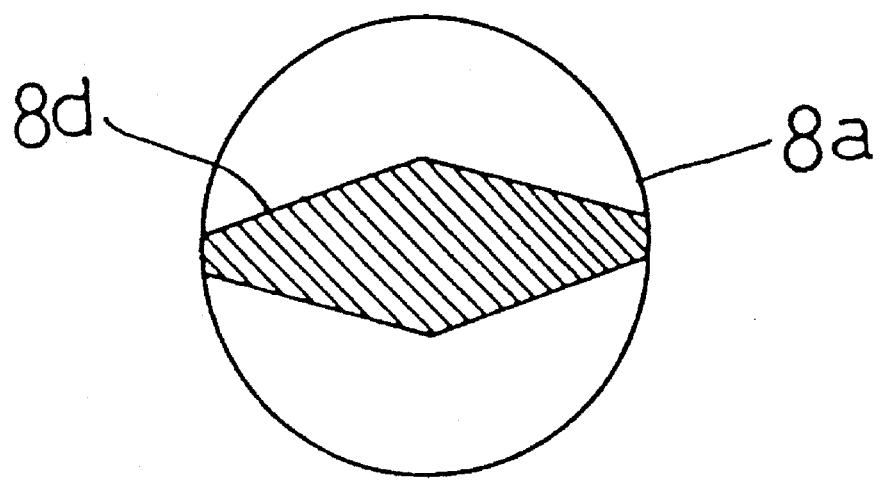
FIG. 13 is a sectional view of a portion of a modified connecting member.
Figure 14:
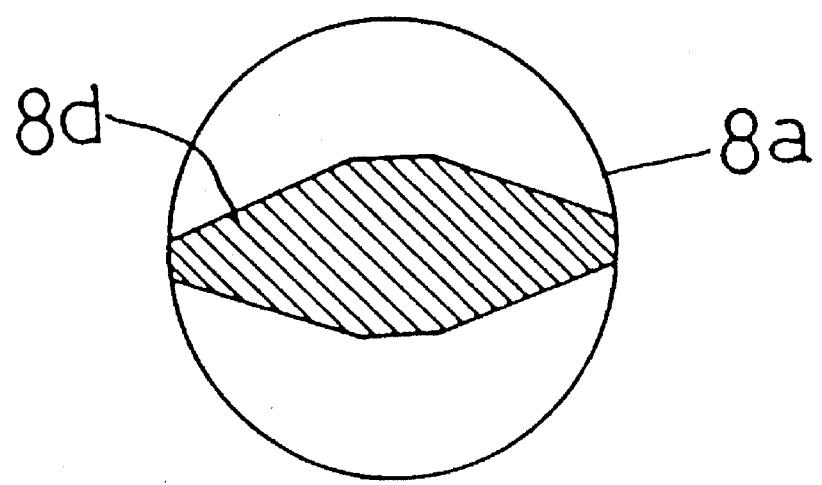
FIG. 14 is a sectional view of a portion of another modified connecting member.

In the above embodiment, each connecting member 8 interconnecting the main body 6 and load supporting deck 7 of the vehicle 1 may have a region 8d lying in the opening "d" of a guide structure including the guide rail 2 and cover 3, which has a sectional shape as shown in FIG. 13 or 14. In FIG. 13, the region 8d has a sectional shape close to a lozenge tapered longitudinally of the vehicle 1 and defining flattened ends. In FIG. 14, the region 8d has a sectional shape close to a lozenge as above, with flattened sides as well. This region "d" will serve the purpose of the present invention as long as it has a substantially lozenge-shaped section tapered longitudinally of the vehicle 1. Such shape may be given to at least the region lying in the opening "d".

A further embodiment will be described next.

Figure 15:
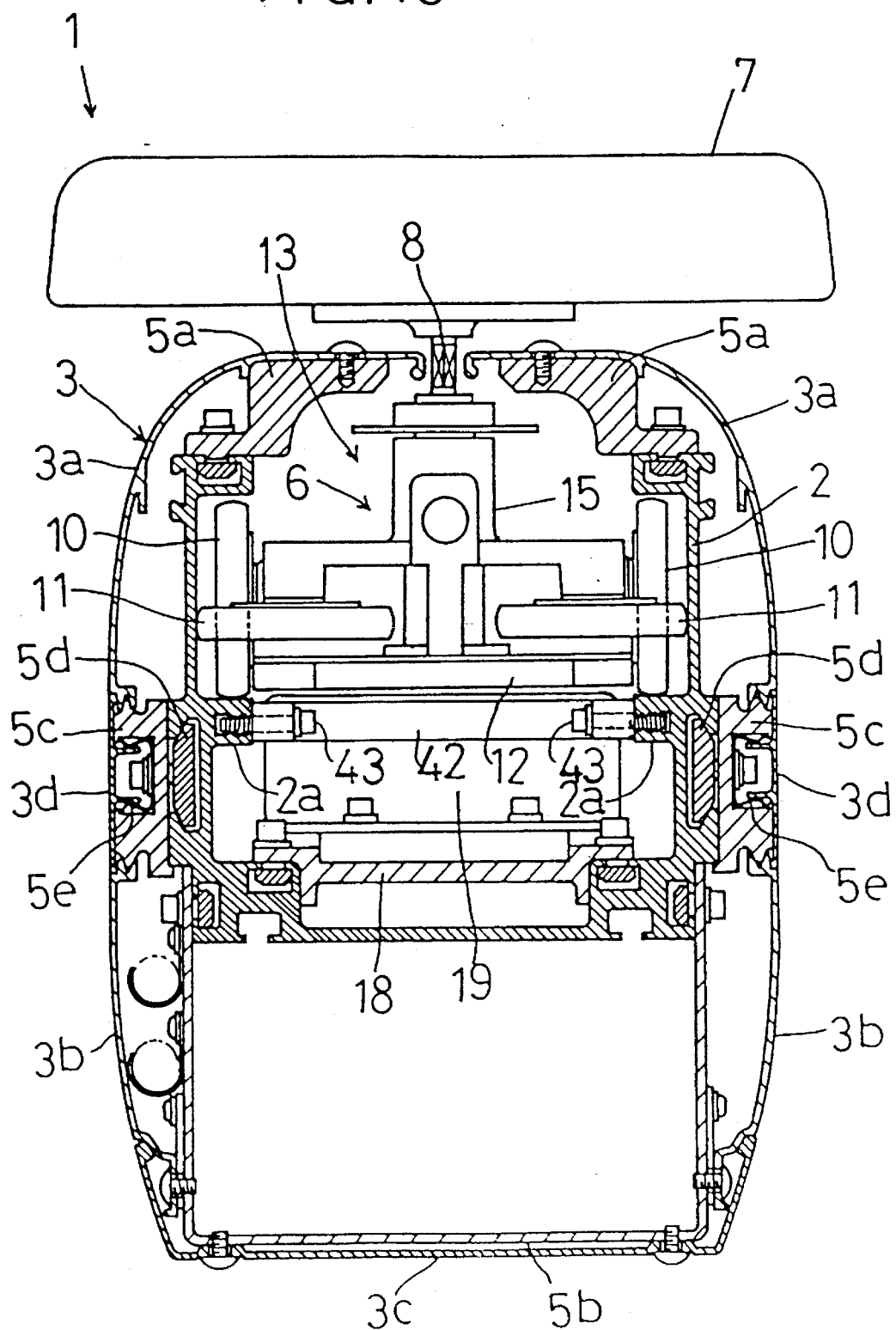
FIG. 15 is a sectional view of a vehicle and a guide rail of a transport system in a further embodiment of the invention.
Figure 16:
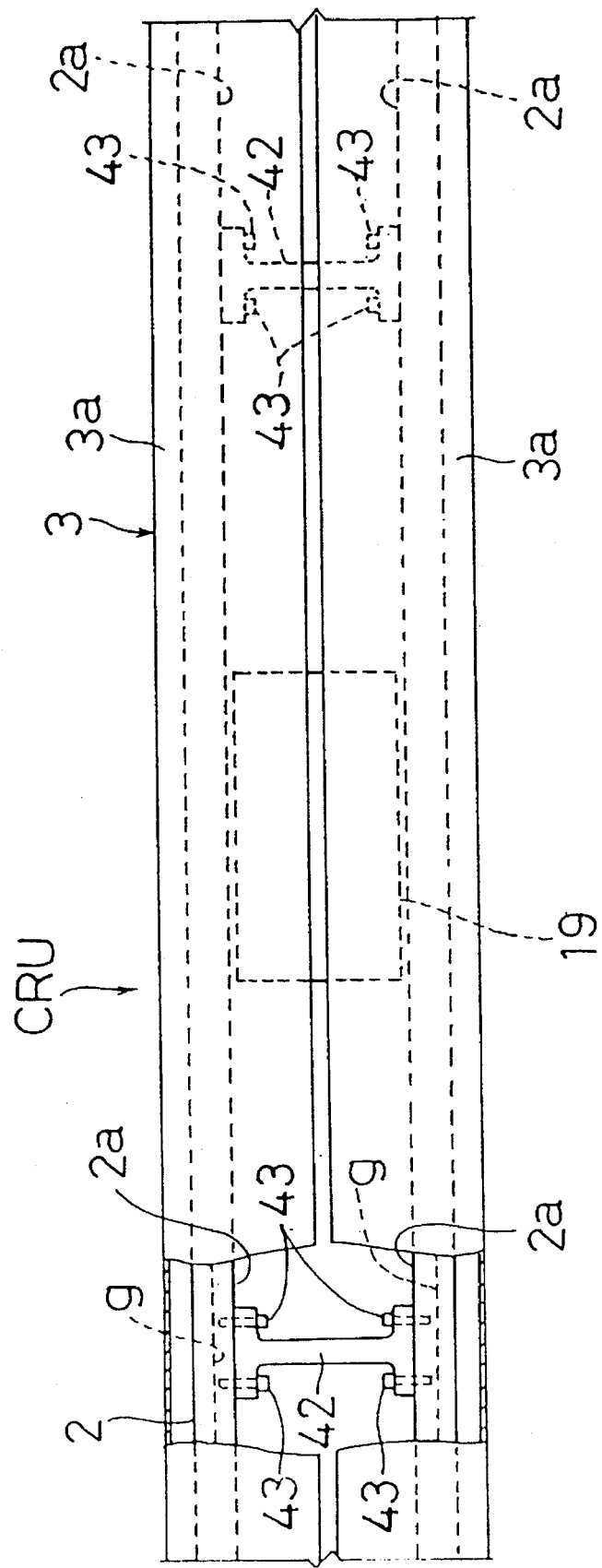
FIG. 16 is a plan view of the guide rail shown in FIG. 15 and having struts.

As shown in FIGS. 15 and 16, the guide rail 2 includes struts 42 extending between the right and left horizontal guides 2a formed on the right and left inner walls of the guide rail 2. The struts 42 are arranged at suitable intervals longitudinally of the guide rail 2. These struts 42 are provided in order to prevent the inner walls of the guide rail 2 from bending inwardly under the weight of the vehicle 1 and loads carried by the vehicle 1.

The struts 42 are fixed to the horizontal guides 2a as follows.

Figure 17:
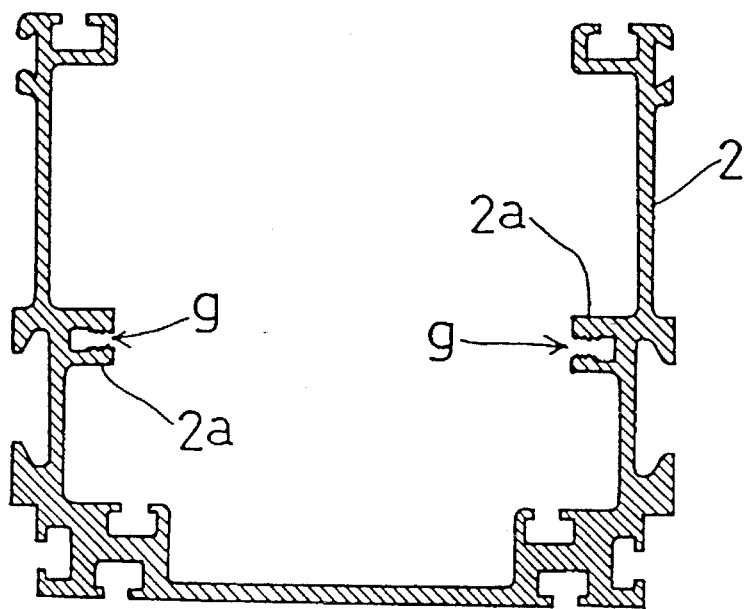
FIG. 17 is a sectional view of the guide rail shown in FIG. 15.
Figure 18:
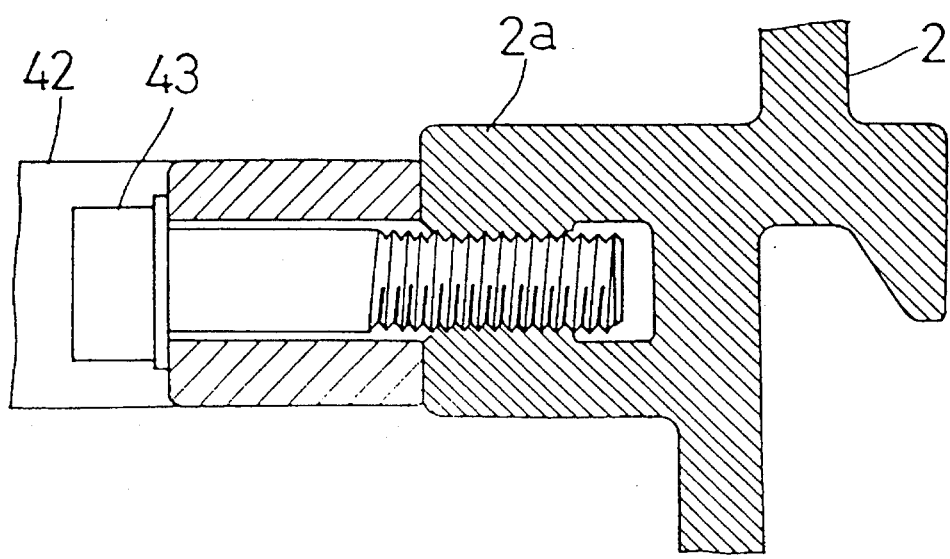
FIG. 18 is an enlarged sectional view showing a strut fastened by a screw to a horizontal guide of the guide rail shown in FIG. 15.

As shown in FIGS. 17 and 18, each horizontal guide 2a includes a recess or groove "g" formed in a substantially middle position in the direction of thickness thereof. The groove "g" defines corrugated upper and lower surfaces. These grooves "g" are formed when the guide rail 2 is manufactured by extrusion molding, and do not require after-processing.

As shown in FIG. 15, 16 and 18, each strut 42 is fixed to the horizontal guides 2a by screwing a total of four bolts 43 to the grooves "g", i.e. two bolts to each of the right and left grooves "g". That is, the corrugations formed on the upper and lower surfaces of the grooves "g" act as female screws for meshing with the bolts 43. Thus, the struts 42 may be fixed to any selected positions longitudinally of the guide rail 2.

As seen from FIG. 15, the primary coils 19 and struts 42 cannot be disposed in the same positions. FIG. 16 shows a portion of the guide rail 2 in an intermediate rail unit CRU. A primary coil 19 of the linear motor is mounted in a longitudinally middle position of this rail unit CRU, with two struts 42 mounted in positions suitably spaced from opposite ends of the primary coil 19.

Figure 19:
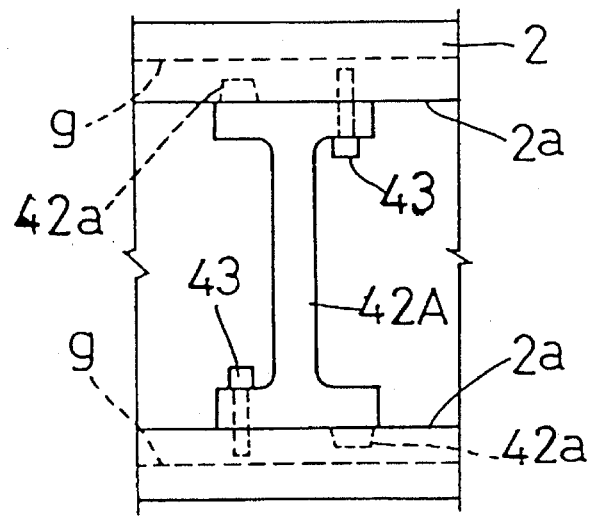
FIG. 19 is a plan view showing a modified strut mounting structure.

The manner in which the struts 42 are fixed to the horizontal guides 2a is not limited to this embodiment. As shown in FIG. 19, for example, each strut 42A may be fixed in position by two bolts 43, one on each of the fight and left sides. Portions of the strut 42A not fixed by the bolts define projections 42a inserted into the grooves "g" of the horizontal guides 2a.

Figure 20:
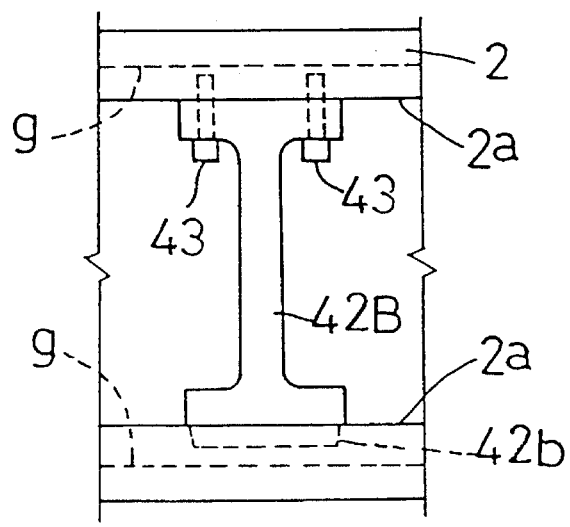
FIG. 20 is a plan view showing another modified strut mounting structure.

Further, as shown in FIG. 20, each strut 42B may have a projection 42b at one end thereof to be inserted into the groove "g" of one of the horizontal guides 2a, with the other end fixed to the other horizontal guide 2a by two bolts 43. In this case, the groove "g" for receiving the projection 42b need not define corrugated upper and lower surfaces since the bolts 43 are not screwed thereinto. In the examples shown in FIGS. 19 and 20, however, the struts 42A or 42B must be slid into an end of the guide rail 2 to fit the projections 42a of 42b into the groove or grooves "g".

Figure 21:
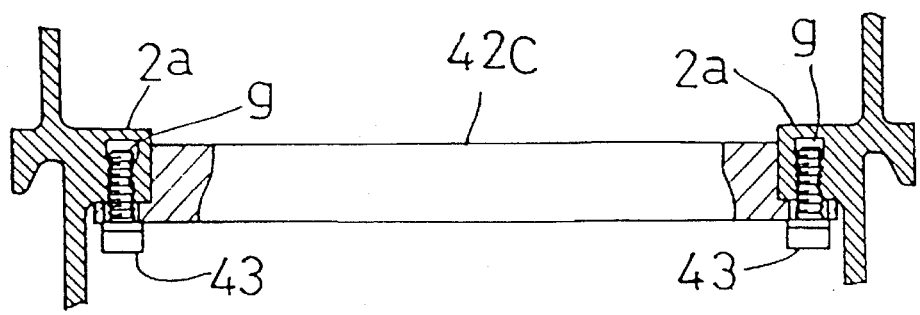
FIG. 21 is a sectional view showing a further modified strut mounting structure.

As shown in FIG. 21, each strut 42C may be fixed by bolts 43 screwed to lower surfaces of the fight and left horizontal guides 2a.

A further embodiment will be described next.

This embodiment will be described in relation to the brake unit 17 of the vehicle 1 and a brake control device provided on the guide rail 2 which act as an emergency brake.

This brake is used to stop the vehicle 1 mechanically when the primary coils 19 become unable to control running of the vehicle 1 owing to power failure or the like.

Figure 22:
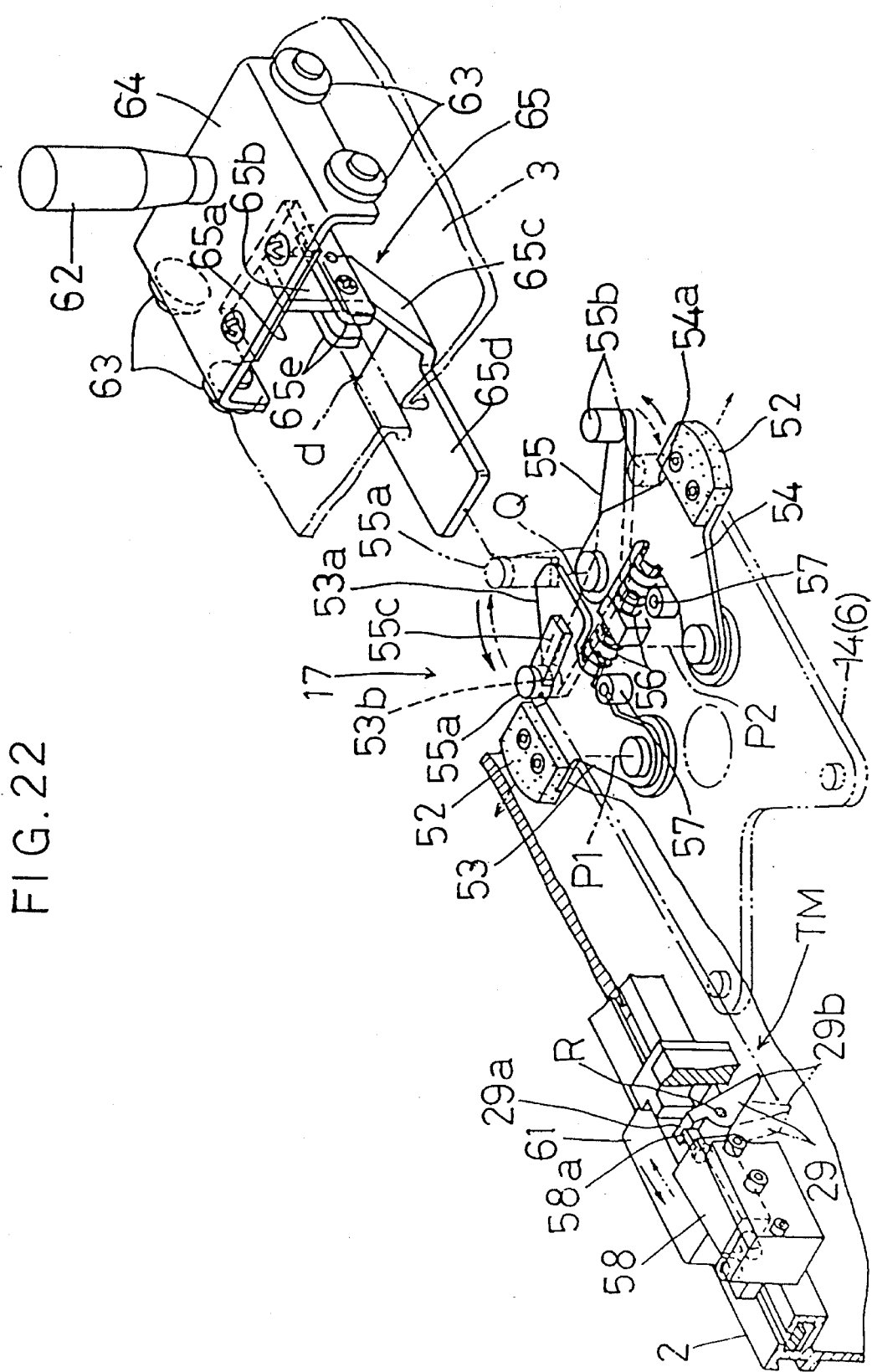
FIG. 22 is an explanatory perspective view showing a relationship among a brake unit, a brake releasing device and a brake control device in a different embodiment of the invention.
Figure 23:
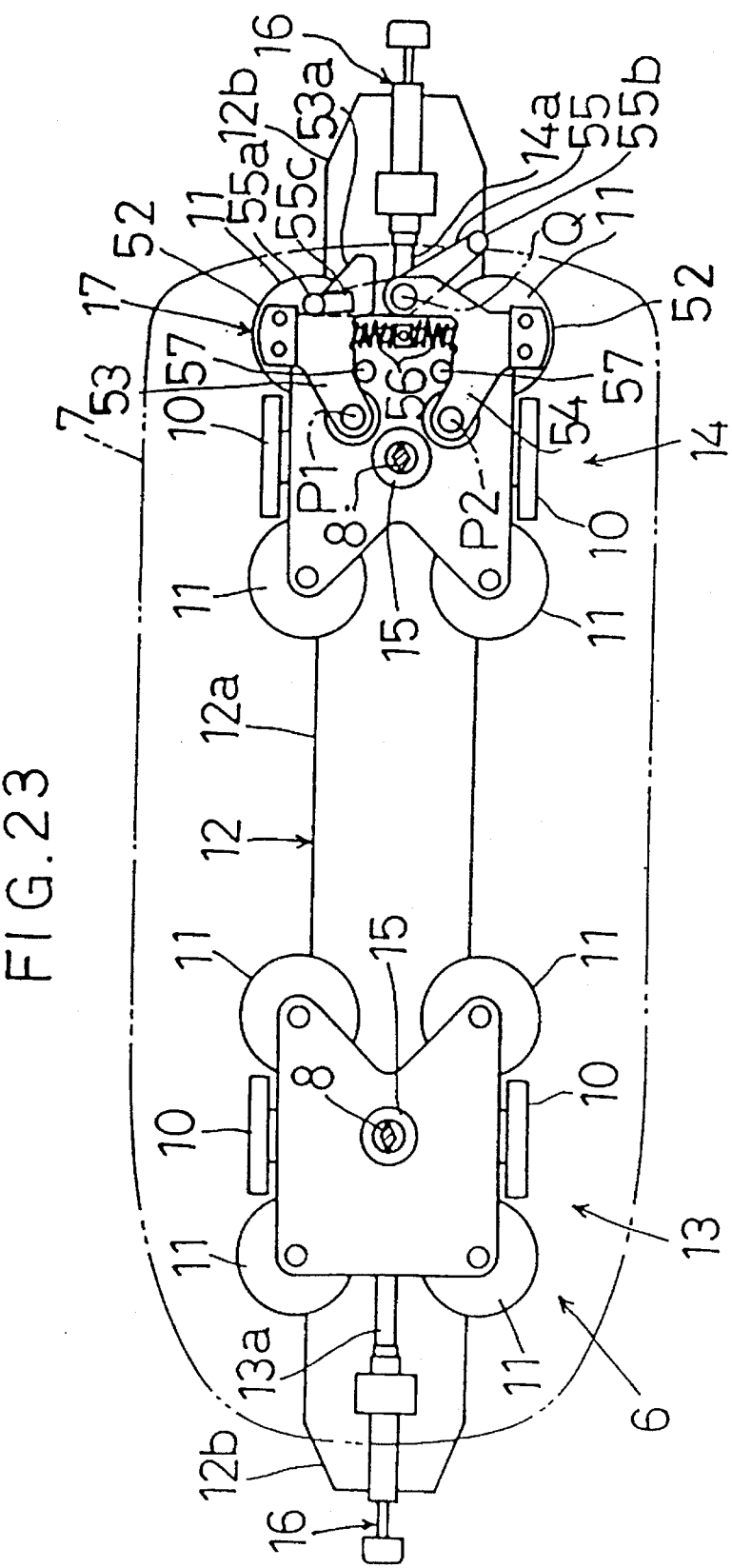
FIG. 23 is a plan view of a vehicle in the different embodiment.

The brake unit 17 mounted on the rear wheel unit 14 of the vehicle 1 will be described first. As shown in FIGS. 22 and 23, the brake unit 17 includes a pair of fight and left brake shoes 52, supporting arms 53 and 54 for supporting the brake shoes 52, and a lock lever 55 acting as retaining means. The support arms 53 and 54 fixedly supporting the brake shoes 52 are pivotally connected to the of the rear wheel unit 14 through vertical axes P1 and P2, and biased a pair of compression coil springs 56 in directions to open fight and left, spectively. In an opened condition, the brake shoes 52 contact the fight left inner walls of the guide rail 2 to apply a frictional braking force, the opened condition corresponds to a braking condition.

The lock lever 55 is pivotally connected in an intermediate position thereof to one of the support arms 54 through a vertical axis Q. When the lock lever 55 is turned in a direction indicated by solid line arrows (counterclockwise) in FIG. 22, a projection (vertical pin) 55a formed at one and thereof moves while pushing a periphery 53a of the support arm 53, thus compressing the compression coil springs 56, into engagement with a recess 53b peripherally of the support arm 53.

With the 55a of the lock lever 55 engaged with the recess 53a of the support 53, the support arms 53 and 54 are maintained in a closed condition, that is the brake shoes 52 are maintained in positions retracted from the inner walls of the guide rail 2 (brake releasing condition). A pair of pins 57 are erected on the frame to check transverse displacement of the support arms 53 and 54 in the brake releasing condition.

When the vehicle 1 is running, the brake shoes 52 are maintained in the brake releasing condition described above. When the lock lever 55 is turned in a direction indicated by two-dot-and-dash line arrows (clockwise) in FIG. 22, the projection of the lock lever 55 is disengaged from the recess 53b of the support arm 53 (i.e. unlocked). Then, the brake shoes 52 move to the braking positions under the biasing force of the compression coil springs 56.

A similar (vertical pin) 55b is formed at the end of the lock lever 55 remote the projection 55a. When the lock lever 55 is unlocked, the projection 55b contacts a periphery 54a of the support arm 54 to limit the clockwise movement of the lock lever 55. The projection 55a of the lock lever 55 includes a jaw 55c extending parallel to a main body of the lock lever 55. The periphery 53a of the support arm 53 lies between the jaw 55c and the main body of the lock lever 55. This construction checks vertical relative displacement between the support arms 53 and 54, and allows smooth switching thereof between the opened and closed positions.

A brake control device TM provided on the guide rail 2 will be described next. This device TM is operable as a ground control to turn the lock lever 55 on the running vehicle 1 to the unlocked position to brake the vehicle 1.

Figure 26:
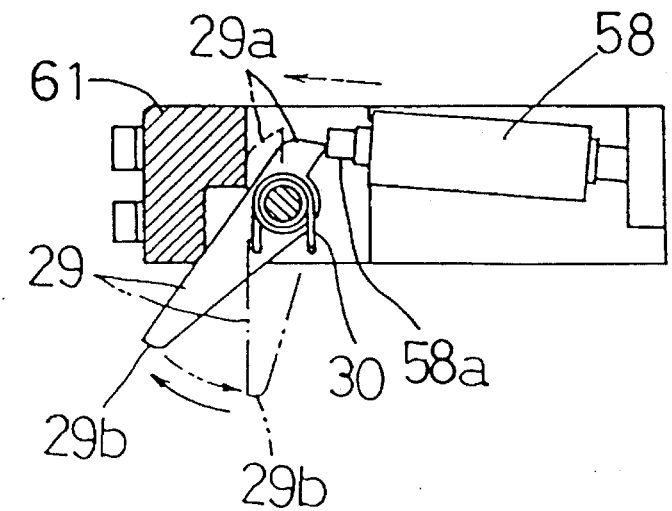
FIG. 26 is a sectional view of the brake control device.

As shown in FIGS. 22 and 26, the brake control device TM includes a solenoid 58, a trigger lever 29 and a torsion spring 30. The brake control device TM is attached to an upper position of the guide rail 2 through a bracket 61. The trigger lever 29 is pivotally connected to the bracket 61 through a horizontal axis R. Referring to FIG. 26, the trigger lever 29 is pivotable between a position shown in a solid line (normal position) and a position shown in a two-dot-and-dash line (emergency position), and biased to the normal position by the torsion spring 30.

The solenoid 58 has a plunger 58a for contacting an upper end 29a of the trigger lever 29. The plunger 58a is extendible and retractable to switch the trigger lever 29 between the normal position and emergency position. Normally, the solenoid 58 is energized to maintain the plunger 58a in the retracted position, which in turn maintains the trigger lever 29 in the normal position (solid link position). When the solenoid 58 is de-energized owing to power failure or the like, the plunger 58a is extended under a biasing force of an internal spring stronger than the torsion spring 30, to switch the trigger lever 29 to the emergency position (two-dot-and-dash line position).

Figure 24:
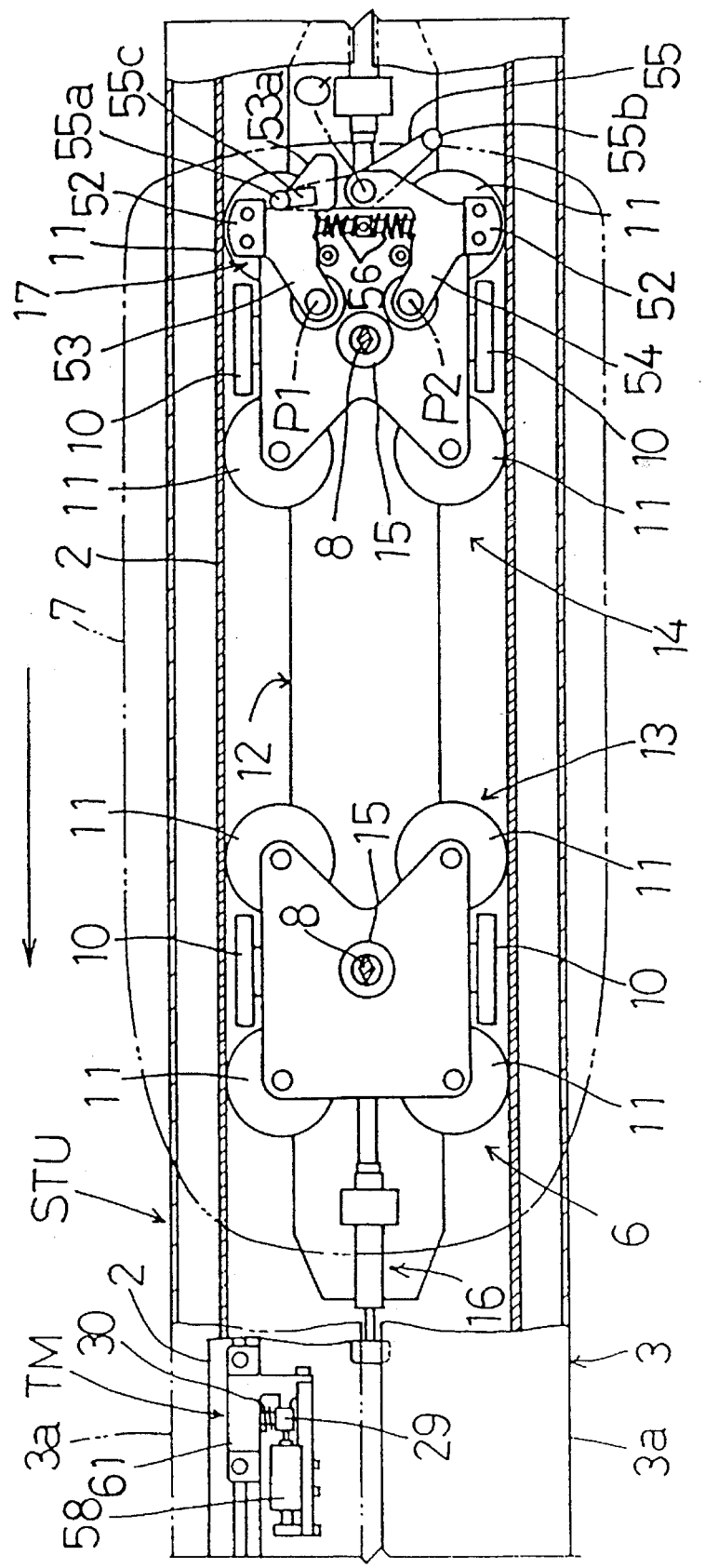
FIG. 24 is a plan view of the vehicle and brake control device.
Figure 25:
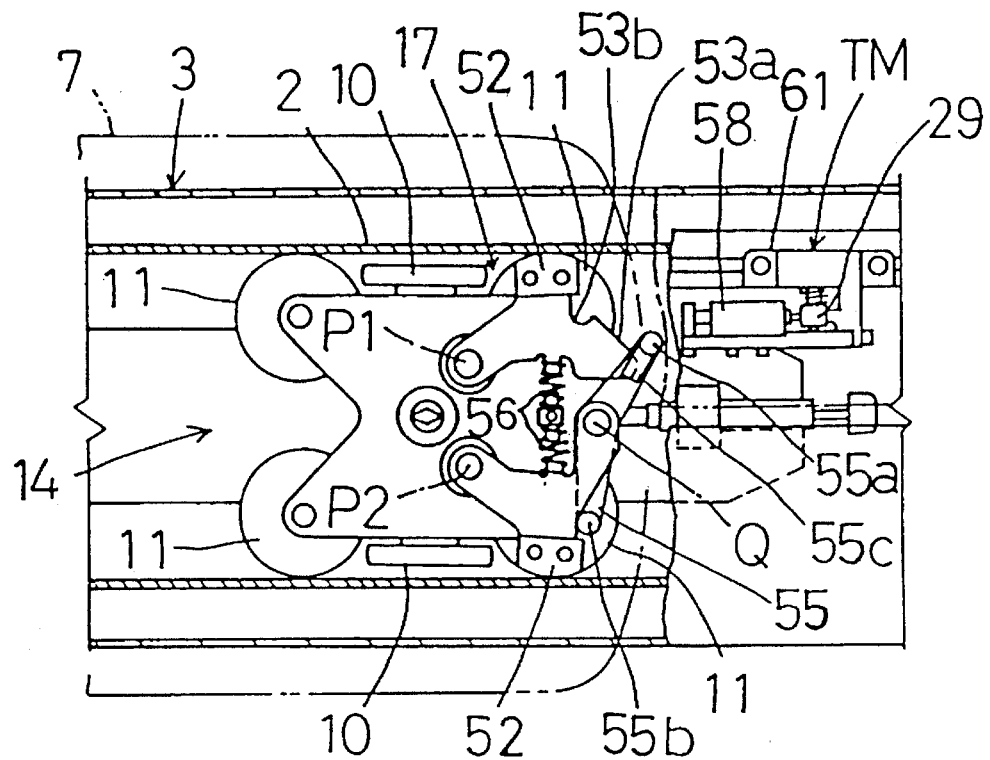
FIG. 25 is a plan view of the brake unit in a braking state.

When the vehicle 1 passes through a location of the brake control device TM, the lock lever 55 moves clear of the trigger lever 29 in the normal position. Consequently, the lock lever 55 remains locked (FIG. 24). When the trigger lever 29 is switched to the emergency position owing to power failure or the like, a lower end 29b of the trigger lever 29 contacts the projection 55a of the lock lever 55 on the vehicle 1 passing through the location of the brake control device TM. As a result, the projection 55a of the lock lever 55 is disengaged from the recess 53b of the support arm 53 (FIG. 25).

With the lock lever 55 unlocked, the brake shoes 52 move to the braking positions. In this condition, the brake shoes 52 are pressed against the fight and left inner walls of the guide rail 2 to stop the vehicle 1. The brake control device TM is installed in each station rail unit STU.

When power supply is resumed, the solenoid 58 is energized to maintain the trigger lever 29 in the normal position again. To resume running of the vehicle 1, however, the brake shoes 52 must be returned from the braking condition to the brake releasing condition and the lock lever 55 reinstated in the locked condition. This operation is carded out through a brake releasing device described hereunder.

As shown in FIG. 22, the brake releasing device includes a manual grip 62 and two pairs of right and left free rotation wheels 63 attached to a base 64. The base 64 is movable on the upper surfaces of the cover 3 of the guide rail 2 and along the opening "d". The brake releasing device further includes an engaging member 65 attached to a bottom surface of the base 64 for extending through the opening "d" into the interior of the cover 3.

The engaging member 65 includes a mounting plate 65a secured to the bottom surface of the base 64 by screws, and an engaging plate welded to a lower surface of the mounting plate 65a. The engaging plate is bent to define three portions, i.e. a vertical portion 65b, a slant portion 65c and a horizontal portion 65d. the vertical portion 65b is sandwiched between slide elements 65e formed of nylon to be slidable smoothly along the opening "d" formed in the upper wall of the cover 3.

Figure 27:
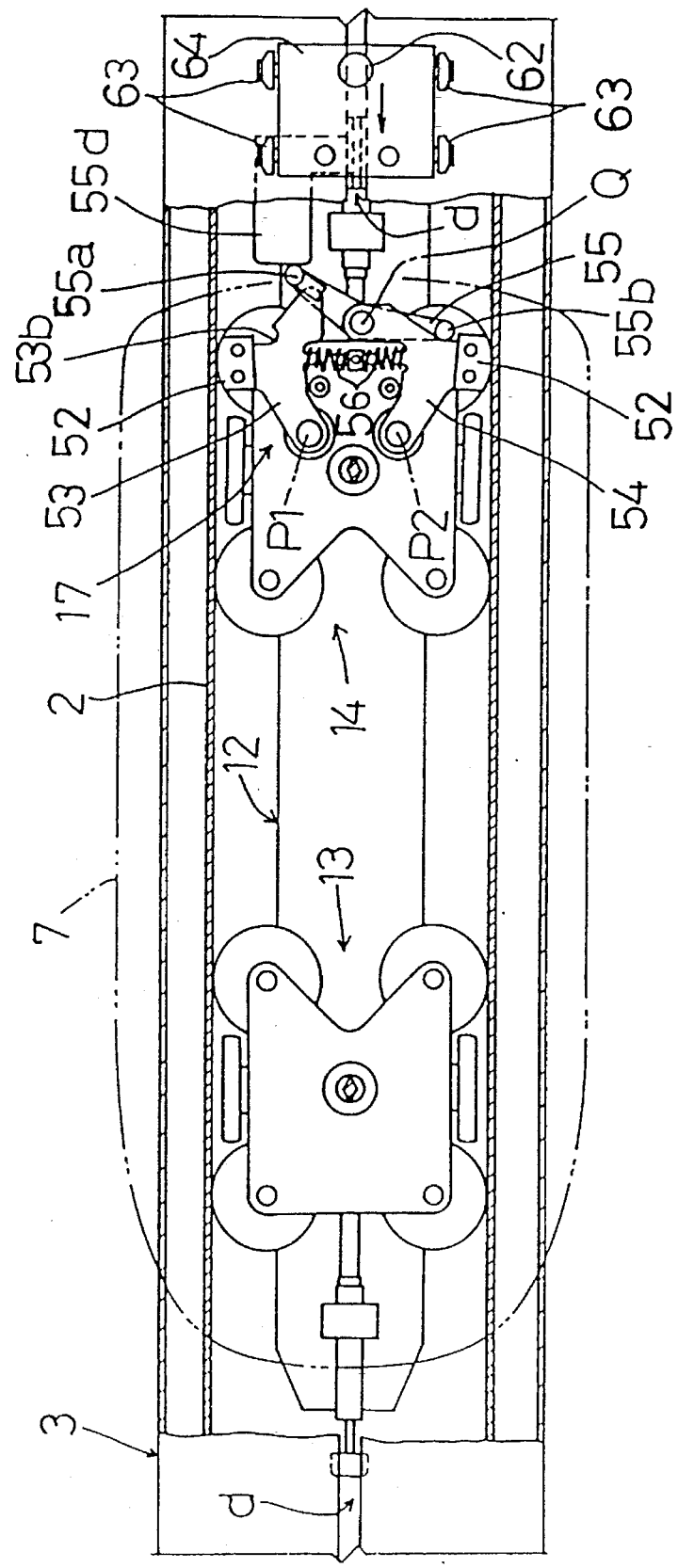
FIG. 27 is a plan view of the vehicle and brake releasing device.
Figure 28:
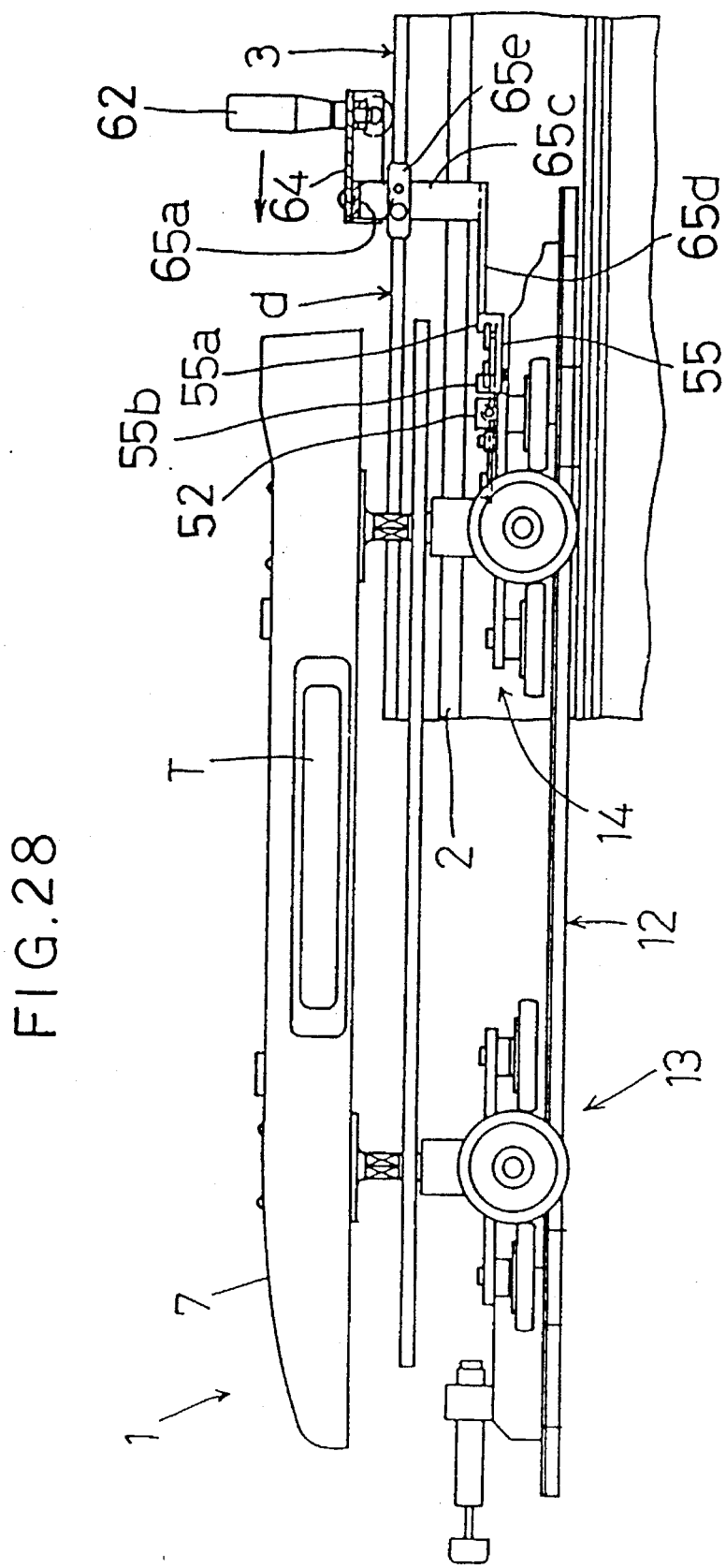
FIG. 28 is a side view of the vehicle and brake releasing device.
Figure 29:
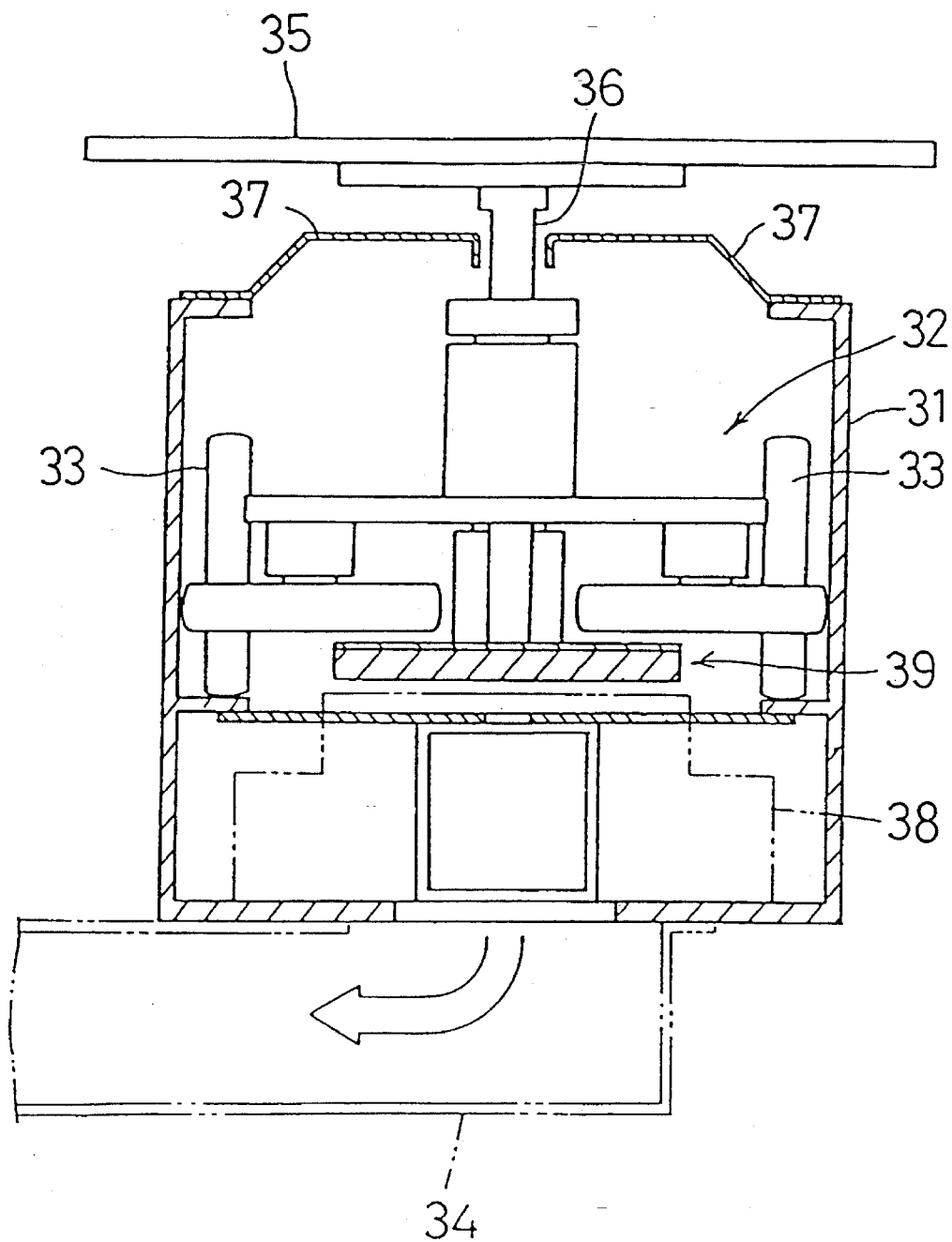
FIG. 29 is a sectional view of a vehicle and a guide rail of a transport system according to the prior art.

As shown in FIGS. 27 and 28, when the base 64 is moved along the upper wall of the cover 3 toward the rear end of the vehicle 1, a forward end of the horizontal portion 65d of the engaging member 65 contacts the projection 55a the lock lever 55. When the base 64 is moved closer to the vehicle 1, the horizontal portion 65d of the engaging member 65 pushes the projection 55a of the lock lever 55. As a result, the lock lever 55 is turned counterclockwise and locked as described above with reference to FIG. 22.

Thus, the operator holds the grip 62 of the brake releasing device, and inserts the engaging member 65 through the opening "d" of the cover 3 of the guide rail 2. The operator then moves the device along the opening "d", with the two pair of right and left free rotation wheels 63 contacting the upper wall surfaces of the cover 3, toward the rear end of the vehicle 1 at an emergency standstill. In this way, the brake may be returned to the brake releasing condition (in which the lock lever 55 is locked) with the brake shoes 52 retracted from the fight and left inner walls of the guide rail 2. In the above operation, the operator should hold the vehicle 1 still with the hand not holding the grip 62.

This embodiment may be modified as follows:

(1) The guide structure is not limited to the construction in the above embodiment which includes the guide rail 2 and the tubular cover 3 enclosing the guide rail 2. A pair of right and left cover members mounted on upper portions of the guide rail 2 having a U-shaped section to cover only the upper opening thereof. In this embodiment, the main body of the vehicle is contained in the vehicle guide, and the connecting members interconnecting the main body and the load supporting deck disposed over the main body extend through he slit-like opening formed in the upper wall of the guide structure. An important aspect of this embodiment is that, by using the brake releasing device the braked condition of the vehicle may be canceled while the main body of the vehicle remains inside the guide structure, to allow the vehicle to run again.

(2) Instead of providing the grip 62 attached to the base 64 of the brake releasing device the base itself may be shaped to facilitate gripping. The free rotation wheels for facilitating movement of the base along the upper wall of the guide may be replaced by slide elements formed of nylon, for example.

(3) The present invention is applicable also to a magnetic levitation type transport system in which a vehicle is magnetically levitated from a guide rail.

What is claimed is:

1. A cleanroom transport system comprising:

a vehicle for transporting loads;

a guide rail installed for guiding said vehicle in a cleanroom where clean air is caused to flow from a ceiling toward a floor surface; and a tubular cover which substantially encloses said guide rail and is spaced therefrom, wherein said vehicle includes a main body for running along said guide rail, a load supporting deck disposed over said main body, and connecting members for interconnecting said main body said load supporting deck; and said tubular cover an opening extending longitudinally of said guide rail for receiving said connecting members, said tubular cover having a substantially streamline configuration with respect to a section of clean air flows, as seen in a longitudinal action thereof.

2. A cleanroom transport system comprising:

a vehicle for transporting loads;

a guide rail installed for guiding said vehicle in a cleanroom where clean air is caused to flow from a ceiling toward a floor surface; and a tubular cover including a plurality of separate cover members which are connected to each other in a continuous and surface-flush manner to cover said guide rail;

said tubular cover having a substantially streamline configuration with respect to a direction of clean air flows, as seen in a longitudinal direction thereof; wherein said vehicle includes main body for running along said guide rail, a load supporting deck disposed over said main body, and connecting member for interconnecting said main body and said load supporting deck; and said tubular cover includes an opening extending longitudinally of said guide rail for receiving said connecting member.

3. A cleanroom transport system as defined in claim 2, wherein said guide rail and said tubular cover are suspended from the ceiling by support members.

4. A cleanroom transport system as defined in claim 2, wherein said vehicle is propelled by a ground primary type linear motor to run along said guide rail, carrying loads from one station to another.

5. A cleanroom transport system as defined in claim 1, wherein said tubular cover includes a pair of right and left upper cover members, a pair of right and left side cover members, a bottom cover member, and support groove cover members.

6. A cleanroom transport system as defined in claim 5, wherein said support groove cover members are formed of plastic while the other cover members are formed of an aluminum alloy.

7. A cleanroom transport system as defined in claim 1, wherein said guide rail includes air cleaners for drawing and cleaning air from adjacent said main body.

8. A cleanroom transport system as defined in claim 7, wherein said air cleaners are mounted in a space defined by a bottom surface of said guide rail and a lower wall of said tubular cover.

9. A cleanroom transport system as defined in claim 8, wherein said guide rail includes a plurality of station rail units, a plurality of intermediate rail units and a plurality of curved rail units, wherein said air cleaners are provided in three, large, medium and small, sizes, a large air cleaner being mounted in each station rail unit, a medium size air cleaner being mounted in each intermediate rail unit, and a small air cleaner being mounted in each curved rail unit.

10. A cleanroom transport system as defined in claim 8, wherein a base plate is provided at a recess defined in a bottom of said guide rail, said guide rail and said base plate together acting as an air suction duct.

11. A cleanroom transport system as defined in claim 10, wherein said base plate defines openings for communicating between said air suction duct and upper spaces of said base plate, and wherein said guide rail defines, at a bottom thereof, openings for communicating between said air suction duct and said air cleaners.

12. A cleanroom transport system as defined in claim 2, wherein each of said connecting members has a substantially lozenge-shaped cross section tapered longitudinally of said vehicle, at least in a region where said connecting members extend through said opening.

13. A cleanroom transport system as defined in claim 12, wherein said lozenge-shaped cross section taped longitudinally of the vehicle defines flat ends.

14. A cleanroom transport system as defined in claim 13, wherein said lozenge-shaped cross section further defines flattened sides.

15. A cleanroom transport system as defined in claim 12, wherein each of said connecting members has a shank portion and a plate portion formed integrally by casting.

16. A cleanroom transport system as defined in claim 2, wherein said guide rail has a U-shaped section to guide said vehicle for carrying loads and having fight an left running wheels rotatable about horizontal axes, and fight and left rollers rotatable about vertical axes.

17. A cleanroom transport system as defined in claim 16, wherein said guide rail includes a pair of fight and left horizontal guides each projecting inwardly from a vertically intermediate position of an inner wall of said guide rail, said running wheels contacting upper surfaces of said horizontal guides, and said rollers contacting fight and left inner walls above said horizontal guides.

18. A cleanroom transport system as defined in claim 17, wherein said guide rail includes struts extending between said right and left horizontal guides and arranged at suitable intervals longitudinally of said guide rail to prevent the inner walls of said guide rail from bending inwardly.

19. A cleanroom transport system as defined in claim 18, wherein each of said horizontal guides includes a groove formed in a substantially middle position in a direction of thickness thereof, said groove defining upper and lower surfaces corrugated as seen in a longitudinal direction of said guide rail, said struts being fixed to said horizontal guides by bolts screwed into the grooves.

20. A cleanroom transport system as defined in claim 2, wherein said main body includes brake means biased to a braking position, and retaining means for retaining said brake means in a brake releasing position, said guide rail and said tubular cover constituting a guide structure including brake control means for canceling retaining action of said retaining means to move said brake means to said braking position.

21. A cleanroom transport system as defined in claim 20, wherein said guide structure includes brake releasing means for returning said retaining means to an operative state, said brake releasing means including a base movable on upper surfaces of said guide structure and along said opening, and an engaging member attached to said base for extending through said opening into an interior to said guide structure, said engaging member pushing a particular portion of said retaining means to return said retaining means to the operative state as said base is moved along the upper surfaces of said guide structure toward said vehicle braked by said brake means.

22. A cleanroom transport system as defined in claim 21, wherein said base includes a grip handle to facilitate a manual operation.

* * * * *

UNITED STATES PATENT AND TRADEMARK OFFICE
CERTIFICATE OF CORRECTION

PATENT NO. : 5,454,328
DATED : October 3, 1995
INVENTOR(S) : Hiroshi Matsuzaki, Tetsuo Ajimine, Yukio Iizuka, Kenji Itoh and Katsuhiko Ueda It is certified that error appears in the above-indentified patent and that said Letters Patent is hereby corrected as shown below:

Title page, in section [56], References Cited, U.S. PATENT DOCUMENTS, "4,841,869 6/1989 Takevchi et al. ... 104/290 X" should read --4,841,869 6/1989 Takeuchi et al. ... 104/290 X--.

Column 2 Line 25 "tail." should read --rail.--.

Column 2 Line 36 "Connecting" should read --connecting--.

Column 2 Line 46 "mainbody" should read --main body--.

Column 2 Line 55 "fight" should read --right--.

Column 2 Line 59 "fight" should read --right--.

Column 3 Line 3 "fight" should read --right--.

Column 3 Line 6 "fight" should read --right--.

Column 5 Line 43 "fight" should read --right--.

Column 5 Line 63 "fight" should read --right--.

Column 5 Line 64 "fight" should read --right--.

Column 6 Line 42 "fight" should read --right--.

Column 6 Line 44 "carries" should read --carriers--.

UNITED STATES PATENT AND TRADEMARK OFFICE
CERTIFICATE OF CORRECTION

PATENT NO. : 5,454,328
DATED : October 3, 1995
INVENTOR(S) : Hiroshi Matsuzaki, Tetsuo Ajimine, Yukio Iizuka, Kenji Itoh and Katsuhiko Ueda It is certified that error appears in the above-indentified patent and that said Letters Patent is hereby corrected as shown below:

Column 6 Line 49 "fight" should read --right--.

Column 6 Line 51 "fight" should read --right--.

Column 6 Line 60 "fight" should read --right--.

Column 7 Line 3 "pans" should read --parts--.

Column 7 Line 5 "pan" should read --part--.

Column 7 Line 7 "pans" should read --parts--.

Column 7 Line 16 "fight" should read --right--.

Column 7 Line 17 "fight" should read --right--.

Column 7 Line 20 "pan" should read --part--.

Column 7 Line 23 "pan" should read --part--.

Column 7 Line 59 "Controlled" should read --controlled--.

Column 8 Line 1 "Controls" should read --controls--.

Column 8 Line 6 "of, the" should read --of the--.

Column 8 Line 16 "fight" should read --right--.

Column 8 Line 29 "crews" should read --screws--.

UNITED STATES PATENT AND TRADEMARK OFFICE
CERTIFICATE OF CORRECTION

PATENT NO. : 5,454,328

DATED : October 3, 1995

INVENTOR(S) : Hiroshi Matsuzaki, Tetsuo Ajimine, Yukio Iizuka, Kenji Itoh and Katsuhiko Ueda It is certified that error appears in the above-indentified patent and that said Letters Patent is hereby corrected as shown below:

Column 8 Line 35 "With" should read --with--.

Column 9 Line 24 "fight" should read --right--.

Column 9 Line 25 "fight" should read --right--.

Column 9 Line 26 "pans" should read --parts--.

Column 10 Line 13 "fight" should read --right--.

Column 10 Line 27 "42a of" should read --42a or--

Column 10 Line 29 "fight" should read --right--.

Column 10 Line 41 "fight" should read --right--.

Column 10 Line 45 after "to the" insert --frame--.

Column 10 Line 46 after "biased" insert --by--.

Column 10 Line 48 "fight" should read --right--.

Column 10 Line 48 "spectively." should read --respectively.--.

Column 10 Line 49 "fight left" should read --right and left--.

UNITED STATES PATENT AND TRADEMARK OFFICE
CERTIFICATE OF CORRECTION

PATENT NO. : 5,454,328
DATED : October 3, 1995
INVENTOR(S) : Hiroshi Matsuzaki, Tetsuo Ajimine, Yukio Iizuka, Kenji Itoh and Katsuhiko Ueda It is certified that error appears in the above-indentified patent and that said Letters Patent is hereby corrected as shown below:

Column 10 Line 50 "force, the" should read --force. Thus, the--.

Column 10 Line 56 "and" should read --end--.

Column 10 Line 59 after "53b" insert --formed--.

Column 10 Line 61 before "55a" insert --projection--.

Column 10 Line 62 "support 53," should read --support arm 53,--.

Column 11 Line 5 after "projection" insert --55a--.

Column 11 Line 9 after "similar" insert --projection--.

Column 11 Line 10 after "remote" insert --from--.

Column 11 Line 41 "link" should read --line--.

Column 11 Line 61 "fight" should read --right--.

Column 12 Line 2 "carded" should read --carried--.

Column 12 Line 25 after "55a" insert --of--.

Column 12 Line 40 "fight" should read --right--.

UNITED STATES PATENT AND TRADEMARK OFFICE
CERTIFICATE OF CORRECTION

PATENT NO. : 5,454,328
DATED : October 3, 1995
INVENTOR(S) : Hiroshi Matsuzaki, Tetsuo Ajimine, Yukio Iizuka, Kenji Itoh and Katsuhiko Ueda It is certified that error appears in the above-indentified patent and that said Letters Patent is hereby corrected as shown below:

Column 12 Line 54 "he slit-like" should read --the slit-like--.

Claim 1 Line 9 Column 13 "therefrom," should read --therefrom;--.

Claim 1 Line 14 Column 13 after "body" insert --and--.

Claim 1 Line 16 Column 13 after "cover" insert --includes--.

Claim 1 Line 19 Column 13 "section" should read --direction--.

Claim 1 Line 20 Column 13 "action" should read --direction--.

Claim 2 Line 34 Column 13 after "includes" insert --a--.

Claim 2 Line 36 Column 13 "member" should read --members--.

Claim 5 Line 48 Column 13 "1" should read --2--.

Claim 7 Line 57 Column 13 "1" should read --2--.

Claim 16 Line 31 Column 14 "fight an" should read --right and--.

UNITED STATES PATENT AND TRADEMARK OFFICE
CERTIFICATE OF CORRECTION

PATENT NO. : 5,454,328
DATED : October 3, 1995
INVENTOR(S) : Hiroshi Matsuzaki, Tetsuo Ajimine, Yukio Iizuka, Kenji Itoh and Katsuhiko Ueda It is certified that error appears in the above-indentified patent and that said Letters Patent is hereby corrected as shown below:

Claim 16 Line 32 Column 14 "fight" should read --right--.

Claim 17 Line 35 Column 14 "fight" should read --right--.

Claim 17 Line 39 Column 14 "fight" should read --right--.

Claim 21 Line 67 Column 14 "interior to" should read --interior of--.

Signed and Sealed this

Twenty-seventh Day of February, 1996

Attest:

BRUCE LEHMAN

*Attesting Officer*          *Commissioner of Patents and Trademarks*